United States Patent
Jun et al.

(10) Patent No.: US 12,062,790 B2
(45) Date of Patent: Aug. 13, 2024

(54) SOLID-STATE LITHIUM-ION CONDUCTOR AND METHODS OF MANUFACTURE THEREOF

(71) Applicants: SAMSUNG ELECTRONICS CO., LTD., Suwon-si (KR); THE REGENTS OF THE UNIVERSITY OF CALIFORNIA, Oakland, CA (US)

(72) Inventors: KyuJung Jun, Albany, CA (US); Gerbrand Ceder, Orinda, CA (US); Yingzhi Sun, Albany, CA (US); Yan Wang, Brookline, MA (US); Lincoln Miara, Lincoln, MA (US); Yan Zeng, Albany, CA (US); Yihan Xiao, Berkeley, CA (US)

(73) Assignees: SAMSUNG ELECTRONICS CO., LTD., Gyeonggi-Do (KR); THE REGENTS OF THE UNIVERSITY OF CALIFORNIA, Oakland, CA (US); LAWRENCE BERKELEY NATIONAL LABORATORY, Berkeley, CA (US)

( * ) Notice: Subject to any disclaimer, the term of this patent is extended or adjusted under 35 U.S.C. 154(b) by 249 days.

(21) Appl. No.: 17/321,714

(22) Filed: May 17, 2021

(65) Prior Publication Data

US 2022/0102726 A1    Mar. 31, 2022

Related U.S. Application Data

(60) Provisional application No. 63/086,717, filed on Oct. 2, 2020, provisional application No. 63/085,630, filed on Sep. 30, 2020.

(51) Int. Cl.
H01M 4/58    (2010.01)
H01M 10/0525    (2010.01)
H01M 4/02    (2006.01)

(52) U.S. Cl.
CPC ..... *H01M 4/5825* (2013.01); *H01M 10/0525* (2013.01); *H01M 2004/028* (2013.01)

(58) Field of Classification Search
CPC .................................................. H01M 4/5825
See application file for complete search history.

(56) References Cited

U.S. PATENT DOCUMENTS

2012/0009483 A1    1/2012    Chu et al.
2020/0251771 A1*   8/2020    Mo .......................... H01B 1/06
(Continued)

FOREIGN PATENT DOCUMENTS

EP    3713000 A1    9/2020
JP    201576366 A    4/2015
JP    2015076324 A   4/2015

OTHER PUBLICATIONS

Cai, G.M., et al., "Structure, thermal stability and properties of Li3Sc(BO3)2," Journal of Solid State Chemistry, 184 (1), May 2011, pp. 115-122.

(Continued)

*Primary Examiner* — Nathanael T Zemui
(74) *Attorney, Agent, or Firm* — CANTOR COLBURN LLP

(57) ABSTRACT

A solid-state ion conductor including a compound of Formula 1:

$$Li_{(3+2y1)}B(P_{1-y1}Al_{y1}O_4)_2 \quad \text{Formula 1}$$

wherein, in Formula 1, A1 is an element of Groups 4, 14, or a combination thereof, and has an oxidation state of +4, and $0<y1<1$.

16 Claims, 16 Drawing Sheets

(56) References Cited

U.S. PATENT DOCUMENTS

2020/0280093 A1  9/2020  Sakamoto et al.
2021/0399334 A1* 12/2021 Mo ................. H01M 10/0525

OTHER PUBLICATIONS

Chang, K-S., "LiZnBO3: Crystal Structure," Journal of the Korean Chemical Society, vol. 45, No. 3, 2001, pp. 251-255.

Chen, X., et al, "Syntheses and characterization of two alkaline and transition metal orthoborates, LiMBO3 (M=Zn, Cd)," Solid State Sciences, vol. 52, (2016), pp. 132-140.

Chen, X., et al., "Syntheses and characterization of two alkali-metal zinc borates, a-LiZnBO3 and Li0.48Na0.52ZnBO3," Solid State Sciences 11, (2009), pp. 2086-2092.

Daub, M., et al., "Further New Borosulfates: Synthesis, Crystal Structure, and Vibrational Spectra of A[B(SO4)2] (A=Na, K, NH4) and the Crystal Structures of Li5[B(SO4)4] and NH4[B(S2O7)2]," Z. Anorg. Allg. Chem, 640, (14), 2014, pp. 29-14-2921.

Hasegawa, T., et al., "Synthesis, crystal structure and lithium ion conduction of Li3BP2O8," The Royal Society of Chemistry, Dalton Transactions, 43, 2014, pp. 2294-2300, DOI: 10.1039/c3dt52917g.

Hasegawa, T., et al., "The crystal structure of Li2B3PO8 with the 2D-linkage of BO3, BO4 and PO4 groups," The Royal Society of Chemistry, Dalton Transactions, 43, 2014, pp. 14525-14528.

He, M., et al., "Synthesis, Structure, and Thermal Stability of Li3AlB2O6," Journal of Solid State Chemistry 163 (2), pp. 369-376, Feb. 2002.

Penin, N., et al., "Crystal structure of a new lithium indium borate Li3InB2O6," Solid State Sciences, vol. 3, Issue 4, May 2001, pp. 461-468.

Reshak, A., et al., "Band Structure, Density of States, and Optical Susceptibilities of a Novel Lithium Indium Orthoborate Li3InB2O6," J. Phys. Chem. B, vol. 113, No. 34, Aug. 27, 2009, pp. 11583-11588.

Schwendtner, K., et al., "Gittinsite-type M1+-M3+-diarsenates (M1+= Li,Na; M3+=Al, Sc,Ga): insights into an unexpected isotypy and crystal chemistry of diarsenates," Mineralogical Magazine, Jun. 2007, vol. 71(3), pp. 249-263.

Touboul, M., et al., Structure of Dilithium Dimagnesium Trisulfate, Acta Cryst. (1988). C44, pp. 1887-1889.

* cited by examiner 1005 1010 1015

1005 1010 1020 1030 1035

SOLID-STATE LITHIUM-ION CONDUCTOR AND METHODS OF MANUFACTURE THEREOF

CROSS-REFERENCE TO RELATED APPLICATIONS

This application claims priority to U.S. Provisional Patent Application No. 63/085,630, filed on Sep. 30, 2020, and U.S. Provisional Patent Application No. 63/086,717, filed on Oct. 2, 2020, in the United States Patent and Trademark Office, and all the benefits accruing therefrom under 35 U.S.C. § 119, the contents of both of which are incorporated herein in their entirety by reference.

BACKGROUND

(1) Field

Disclosed is a solid-state lithium-ion conductor and methods of manufacturing the solid-state lithium-ion conductor. Also disclosed is a positive electrode comprising the solid-state lithium-ion conductor, a negative electrode comprising the solid-state lithium-ion conductor, and a solid-state battery comprising the solid-state lithium-ion conductor.

(2) Description of the Related Art

Solid-state lithium batteries can provide improved specific energy and energy density, and can avoid safety concerns associated with flammable organic solvents used in liquid electrolytes. Oxide and sulfide solid-state electrolytes have been used. Available sulfides can provide greater lithium conductivity than oxides, however they also present safety concerns, for example reaction with air or water to evolve hydrogen sulfide. Oxides can provide reduced toxicity relative to sulfides, and stability in air, but application of available oxides is limited because of their low conductivity or incompatibility with high-voltage cathode materials or lithium metal.

Thus there remains a need for a solid-state electrolyte which provides improved ionic conductivity and avoids the toxicity and safety concerns associated with sulfides.

SUMMARY

Disclosed is a solid-state ion conductor including a compound of Formula 1:

$$Li_{(3+2y1)}B(P_{1-y1}A1_{y1}O_4)_2 \quad \text{Formula 1}$$

wherein, in Formula 1, A1 is an element of Groups 4, 14, or a combination thereof, and has an oxidation state of +4, and $0<y1<1$.

Also disclosed is a solid-state ion conductor including a compound of Formula 2:

$$Li_{5+4(6-a2)y2}B(S_{1-y2}A2_{y2}{}^{a2}O_4)_4 \quad \text{Formula 2}$$

wherein, in Formula 2, A2 is an element of Groups 4, 5, 14, 15, 17, or a combination thereof, wherein an oxidation state of A2 is $4 \leq a2 \leq 5$, and $0<y2<1$.

Also disclosed is a solid-state ion conductor including a compound of Formula 3:

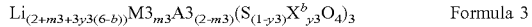

$$Li_{(2+m3+3y3(6-b))}M3_{m3}A3_{(2-m3)}(S_{(1-y3)}X^b{}_{y3}O_4)_3 \quad \text{Formula 3}$$

wherein, in Formula 3,

M3 is an element of Groups 1, 11, or a combination thereof,

A3 is an element of Groups 2, 12, or a combination thereof,

X is an element of Groups 4, 5, 14, 15, 17, or a combination thereof, wherein an oxidation state of X is b, and $0 \leq m3<1$, $0 \leq y3<1$, and $4 \leq b \leq 5$.

Also disclosed is a positive electrode including: a positive active material layer including a lithium transition metal oxide, a lithium transition metal phosphate, or a combination thereof; and the solid-state ion conductor on the positive active material layer.

Also disclosed is an electrochemical cell includes: a positive electrode; a negative electrode; and an electrolyte layer between the positive electrode and the negative electrode, wherein at least one of the positive electrode, the negative electrode, or the electrolyte layer includes the solid-state ion conductor.

BRIEF DESCRIPTION OF THE DRAWINGS

The following figures are exemplary embodiments wherein the like elements are numbered alike, in which.

DETAILED DESCRIPTION

Figure 1A:
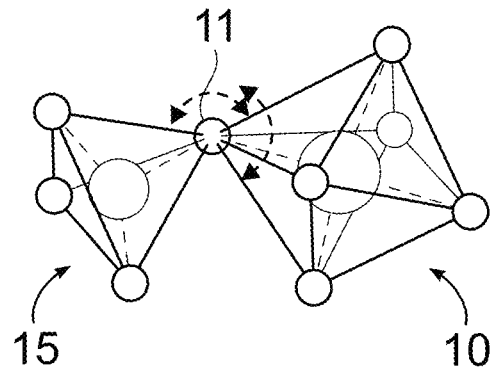
FIGS. 1A and 1B are schematic diagrams illustrating corner-sharing and isolated polyhedra, respectively.
Figure 1B:
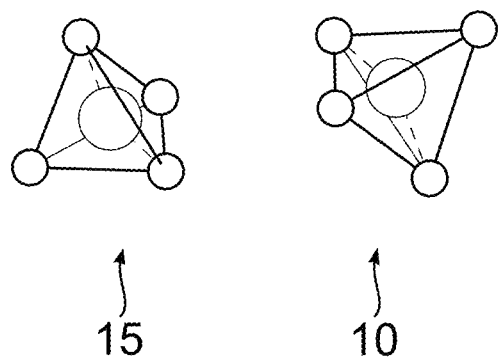
Figure 1C:
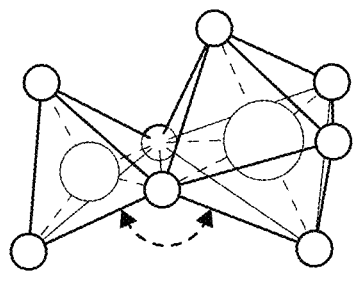
FIGS. 1C and 1D are schematic diagrams illustrating edge-sharing and face-sharing polyhedra, respectively.
Figure 1D:
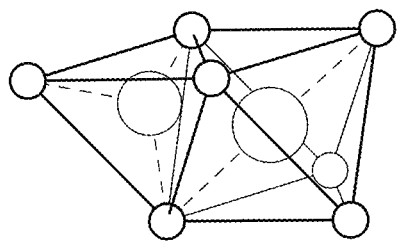

The inventors have discovered an inorganic solid-state ionic conductor that has high ionic conductivity and is useful as a solid electrolyte in a solid-state battery. The disclosed solid-state ionic conductor has a structure in which non-lithium cation-centered polyhedra are present and interconnected by a single corner-shared anion (e.g., oxygen), or the non-lithium cation-centered polyhedra are not interconnected, i.e., they do not share an anion. This structural aspect is shown schematically in FIG. 1A, which shows corner-sharing polyhedra, e.g., a Ta-centered TaO$_6$ octahedron 10 sharing an oxygen 11 with a Si-centered SiO$_4$ tetrahedron 15, and FIG. 1B, which shows isolated polyhedra, e.g., an isolated Si-centered SiO$_4$ tetrahedron and an isolated Ta-centered TaO$_6$ octahedron. While not wanting to be bound by theory, it is understood that in the disclosed materials, non-lithium cation-centered polyhedra never share an edge or face, as shown schematically in FIGS. 1C and 1D, respectively, where the polyhedra share 2 or 3 oxygens, respectively, resulting in edge or face sharing, respectively.

Figure 2A:
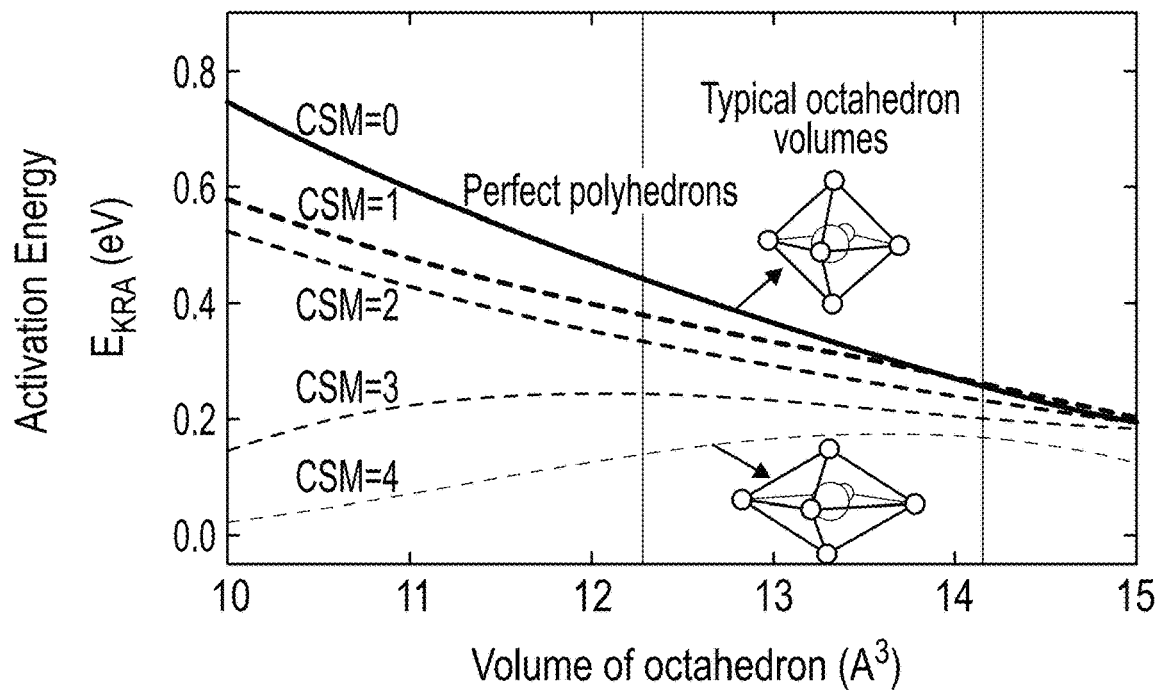
FIG. 2A is a graph of kinetically resolved activation energy (electron-volts, eV) versus octahedron volume (cubic angstroms, Å$^3$) illustrating the reduction of lithium activation energy with increasing distortion of the lithium environment.
Figure 2B:
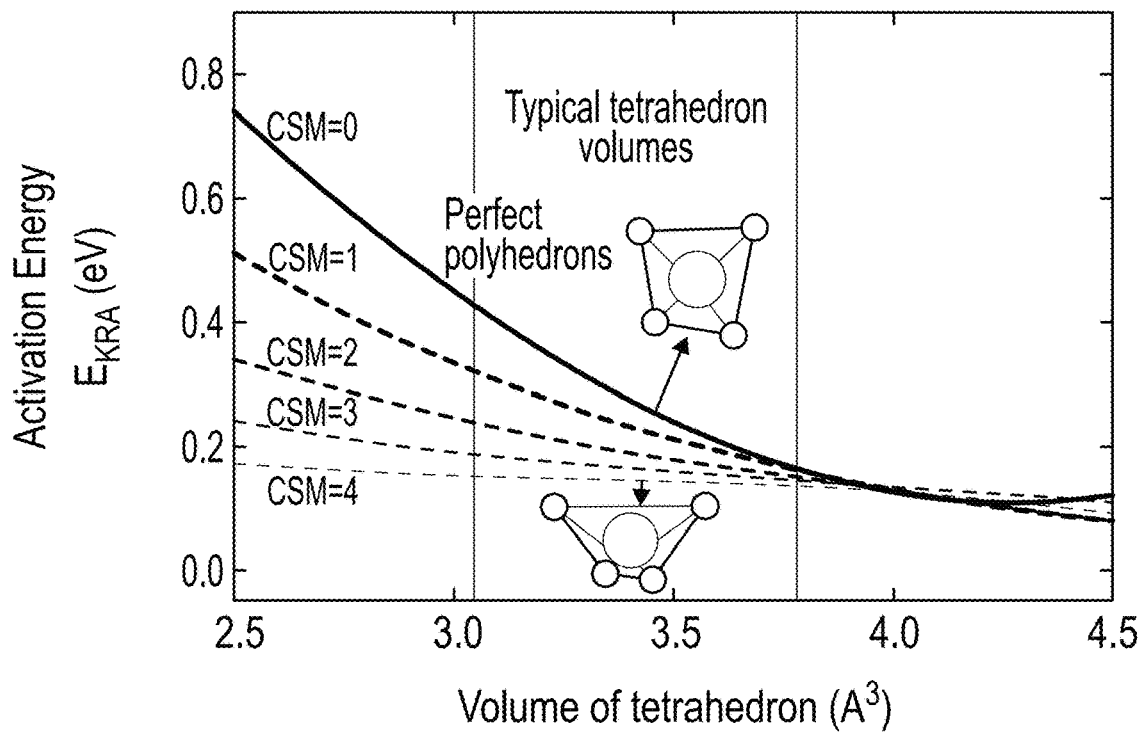
FIG. 2B is a graph of kinetically resolved activation energy (electron-volts, eV) versus tetrahedron volume (cubic angstroms, Å$^3$) illustrating the reduction of lithium activation energy with increasing distortion of the lithium environment.

While not wanting to be bound by theory, it is understood that the ionic conductivity is improved in these materials because structures with corner-sharing frameworks provide highly distorted environments for lithium to occupy. The more distorted lithium environment is understood to result in reduced activation energy, and thus improved ionic conductivity. The reduced activation energy is shown schematically in FIGS. 2A and 2B, which shows that the lithium-ion kinetically resolved activation energy (EKRA) is reduced with greater distortion of the octahedral and tetrahedral lithium coordination environments, respectively. The degree of distortion can be determined using continuous symmetry measure (CSM) as a metric. CSM and its determination is further described in Pinsky, M. & Avnir, D., Continuous Symmetry Measures 5, The Classical Polyhedra., Inorg. Chem., 37, 5575-5582 (1998), the content of which is incorporated herein by reference in its entirety. The minimum CSM of 0 corresponds to a perfectly symmetric coordination environment and the maximum of 67 corresponds to infinite elongation along a single axis. When no distortion is present (CSM=0) the average lithium environment is symmetric, and as the lithium environment is distorted the activation energy is reduced. In the disclosed solid-state ion conductor, the average CSM for lithium is 0<CSM<20, 0.1<CSM<10, 0.2<CSM<5, or 0.4<CSM<4.

In an aspect, disclosed is a solid-state ion conductor comprising a compound of Formula 1:

$$Li_{(3+2y1)}B(P_{1-y1}A1_{y1}O_4)_2 \qquad \text{Formula 1}$$

wherein, in Formula 1, A1 is an element of Groups 4, 14, or a combination thereof, and has an oxidation state of +4, and 0<y1<1.

Figure 3:
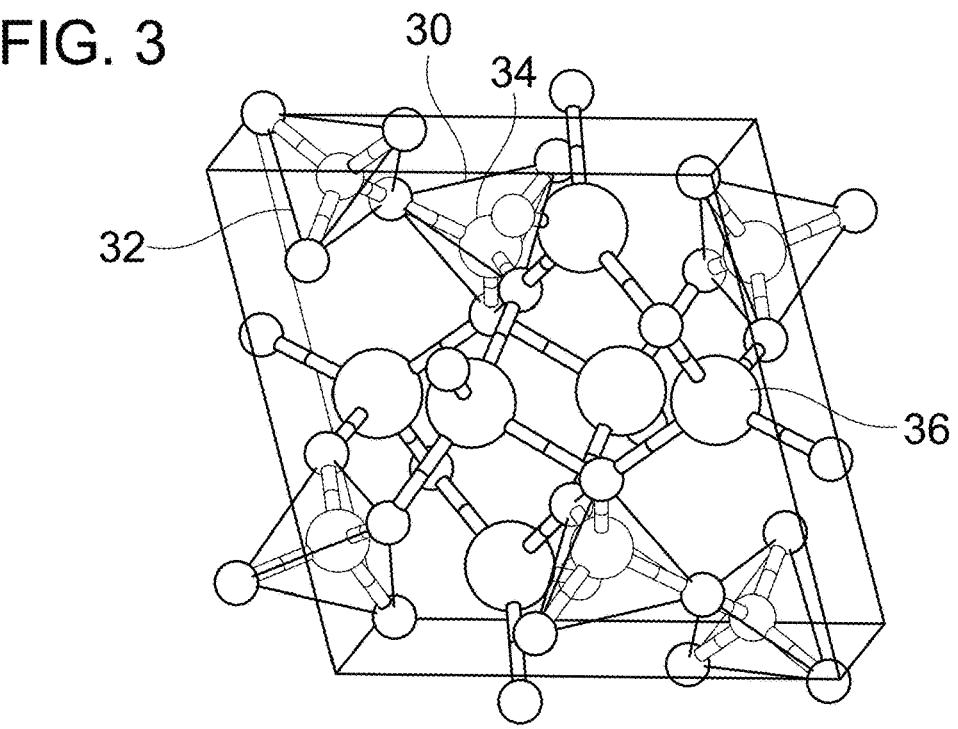
FIG. 3 shows an embodiment of the structure of the solid-ion conductor of Formula 1.

While not wanting to be bound by theory, the solid-state ion conductor of Formula 1 is understood to adopt a structure having a unit cell as shown schematically in FIG. 3, which comprises corner sharing PO$_4$ tetrahedra 30 and BO$_4$ tetrahedra 32. Also indicated in FIG. 3 is Li 36. The corner-sharing framework of PO$_4$ tetrahedra and BO$_4$ tetrahedra are understood to provide a more distorted lithium environment. The dopant A1 is understood to substitute on the P sites 34. Use of the dopant A1 is understood to result in improved lithium concentration that permits the lithium to access additional distorted Li sites within the structure, which in turn is understood to provide reduced activation energy and improved ionic conductivity.

In an aspect, A1 is Ti, Zr, Hf, Si, Ge, Sn, or a combination thereof. Mentioned is use of a Group 14 element, e.g., Si. The content of the dopant y1 can be 0.001<y1<0.6, 0.005<y1<0.4, 0.01<y1<0.2, or 0.03<y1<0.1, as in Li$_{3.125}$B(P$_{0.9375}$Si$_{0.0625}$O$_4$)$_2$.

In an aspect, the solid-state ion conductor comprises a compound of Formula 2:

$$Li_{5+4(6-a2)y2}B(S_{1-y2}A2_{y2}^{a2}O_4)_4 \qquad \text{Formula 2}$$

wherein, in Formula 2, A2 is an element of Groups 4, 5, 14, 15, 17, or a combination thereof, wherein an oxidation state of A2 is 4≤a2≤5, and 0<y2<1.

Figure 4:
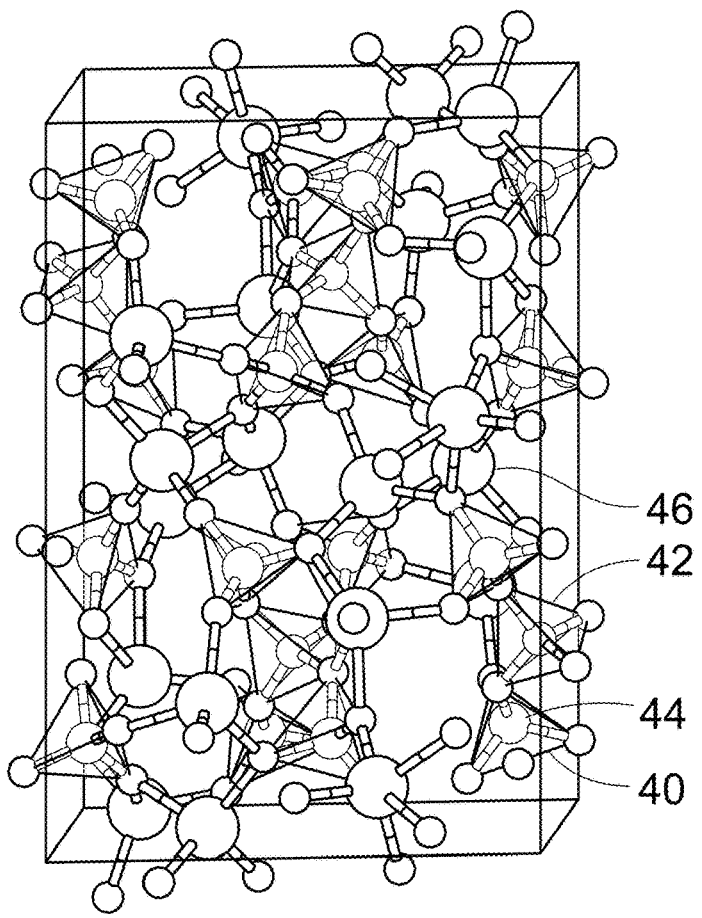
FIG. 4 shows an embodiment of the structure of the solid-ion conductor of Formula 2.

While not wanting to be bound by theory, the solid-state ion conductor of Formula 2 is understood to adopt a structure having a unit cell as shown schematically in FIG. 4, which comprises corner-sharing SO$_4$ tetrahedra 40 and BO$_4$ tetrahedra 42. Also indicated in FIG. 4 is Li 46. The dopant A2 is understood to substitute on the S sites 42. Use of the dopant A2 is understood to result in improved lithium concentration that permits the lithium to access additional distorted Li sites within the structure, which in turn is understood to provide reduced activation energy and increased ionic conductivity.

In aspect, the dopant A2 may be an element of Group 4, e.g., Ti, Zr, Hf, or combination thereof, an element of Group 5, e.g., V, Nb, Ta, or a combination thereof, an element of Group 14, e.g., Si, Ge, Sn, or a combination thereof, an element of Group 15, e.g., P, As, Sb, Bi, or a combination thereof, or an element of Group 17, e.g., Cl, Br, I, or a combination thereof. A combination comprising at least one of the foregoing A2 dopants may be used. Mentioned is use of a Group 15 element, e.g., P.

The dopant A2 is an element having an oxidation state of +4 or +5. In an aspect, the dopant A2 may be a combination of elements of Groups 4, 5, or 14 having an oxidation state of +4, and a2 is 4. In an aspect the dopant A2 may be a combination of elements of Groups 15 or 17 having an oxidation state of +5, and a2 is 5. In an aspect, the dopant A2 may comprise elements having an oxidation state of +4, e.g., Si and +5, e.g., P, and a2 is weighted average based on the molar content of the dopant A2. Thus, for example, if A2 is equal parts Si and P, a2 is 4.5. In Formula 2, $4.1 \leq a2 \leq 4.9$, $4.2 \leq a2 \leq 4.8$, or $4.3 \leq a2 \leq 4.7$.

The content y2 of the dopant A2 is $0 < y2 < 1$. In an aspect y2 is $0.001 < y2 < 0.6$, $0.005 < y2 < 0.4$, $0.01 < y2 < 0.2$, or $0.03 < y2 < 0.1$. Mentioned is use of a dopant content y2 of 0.0625, as in $Li_{5.25}B(S_{0.9375}P_{0.0625}O_4)_4$.

In an aspect, the solid-state ion conductor comprises a compound of Formula 3:

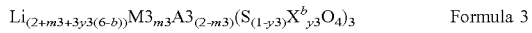

$$Li_{(2+m3+3y3(6-b))}M3_{m3}A3_{(2-m3)}(S_{(1-y3)}X^b_{y3}O_4)_3 \quad \text{Formula 3}$$

wherein, in Formula 3,

M3 is an element of Groups 1, 11, or a combination thereof,

A3 is an element of Groups 2, 12, or a combination thereof,

X is an element of Groups 4, 5, 14, 15, 17, or a combination thereof, wherein an oxidation state of X is b, and $0 \leq m3 < 1$, $0 \leq y3 < 1$, and $4 \leq b \leq 5$.

Figure 5:
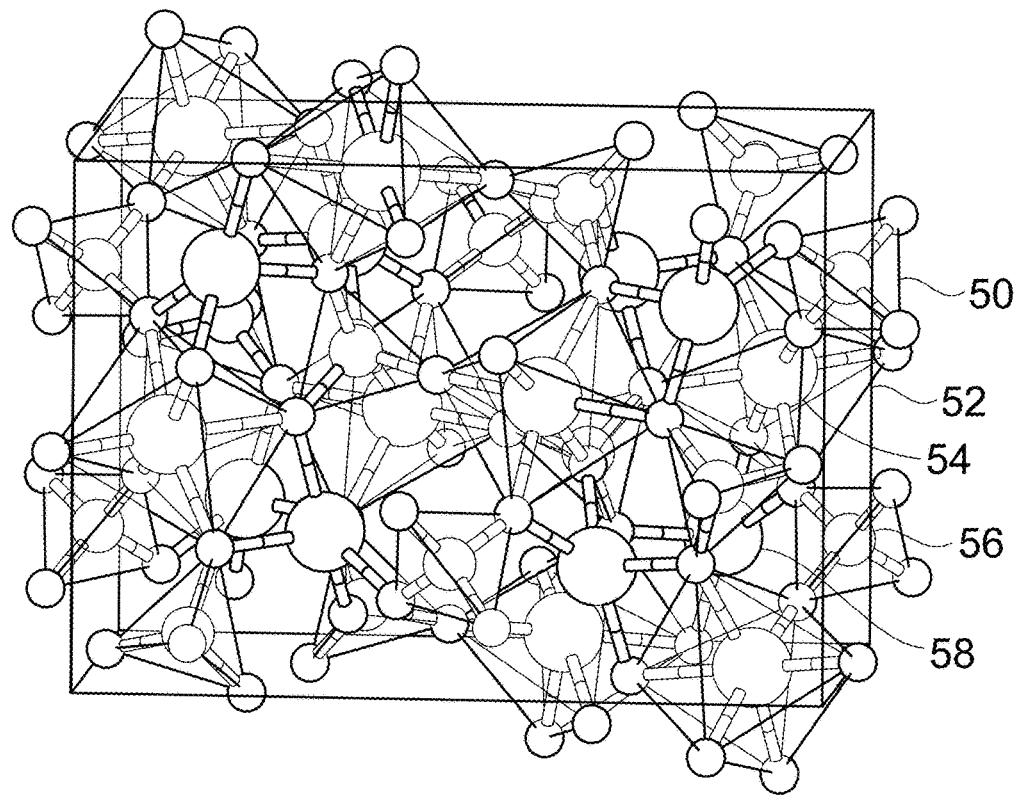
FIG. 5 shows an embodiment of the structure of the solid-ion conductor of Formula 3.

While not wanting to be bound by theory, the solid-state ion conductor of Formula 3 is understood to adopt a structure having a unit cell as shown schematically in FIG. 5, which comprises corner-sharing $SO_4$ tetrahedra 50 and $A3O_6$ octahedra 52, the $SO_4$ tetrahedra are centered by S 56 and the $A3O_6$ octahedra are centered by A3 54. Also indicated in FIG. 5 is Li 58. The dopant M3 is understood to substitute on an A3 site 54, and the dopant X is understood to substitute for S and reside on an S site 56. Doping with M3, X, or a combination thereof is understood to result in improved lithium concentration that permits the lithium to access additional distorted Li sites within the structure, which in turn is understood to provide reduced activation energy and increased ionic conductivity.

In an aspect, A3 in Formula 3 has an oxidation state of +2, and is an element of Group 2, e.g., Mg, Ca, Sr, or a combination thereof, or an element of Group 12, e.g., Zn. A combination comprising at least one of the foregoing may be used.

The dopant M3 has an oxidation state of +1, and may be an element of Group 1, e.g., Li, Na, K, Cs, or a combination thereof, or an element of Group 11, e.g., Cu, Ag, or combination thereof. A combination comprising at least one of the foregoing may be used.

A content m3 of the dopant M3 may be $0.001 \leq m3 < 0.6$, $0.005 \leq m3 < 0.4$, $0.01 \leq m3 < 0.2$, or $0.03 \leq m3 < 0.1$. Mentioned is use of Li as the dopant M3, and a content m3 of 0.25 to provide $Li_{25}Mg_{1.75}(SO_4)_3$, in which the additional $Li_{0.5}$ is understood to reside on a combination of the A3, e.g., Mg sites, and the additional lithium sites within the structure.

In an aspect, the dopant X is an element of Group 4, e.g., Ti, Zr, Hf, or a combination thereof, an element of Group 5, e.g., V, Nb, Ta, or a combination thereof, an element of Group 14, e.g., Si, Ge, Sn, an element of Group 15, e.g., P, As, Sb, Bi, or a combination thereof, or an element of Group 17, e.g., Cl, Br, I, or a combination thereof. A combination comprising at least one of the foregoing X dopants may be used.

The dopant X is an element having an oxidation state of +4 or +5. In an aspect, the dopant X may be a combination of elements of Groups 4, 5, 14, 15, or 17 having an oxidation state of +4, and b is 4. In an aspect the dopant X may be a combination of elements of Groups 15 or 17 having an oxidation state of +5, and b is 5. In an aspect, the dopant X may comprise elements having an oxidation state of +4, e.g., Si and +5, e.g., P, and b is weighted average based on the molar content of the dopant X. Thus, for example, if X is equal parts Si and P, b is 4.5. In Formula 3, $4.1 < x \leq 4.9$, $4.2 \leq x \leq 4.8$, or $4.3 \leq x \leq 4.7$.

The content y3 of X in Formula 3 is $0 < y3 < 1$. In an aspect y3 is $0.001 < y3 < 0.6$, $0.005 < y3 < 0.5$, $0.01 < y3 < 0.4$, or $0.03 < y3 < 0.2$. Mentioned is use of a dopant content y3 of 0.08, as in $Li_{2.25}Mg_2(S_{0.927}P_{0.083}O_4)_3$.

In an aspect, the solid-state ion conductor comprises a compound of Formula 4:

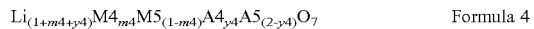

$$Li_{(1+m4+y4)}M4_{m4}M5_{(1-m4)}A4_{y4}A5_{(2-y4)}O_7 \quad \text{Formula 4}$$

wherein, in Formula 4,

M4 is an element of Group 2, an element of Group 12, or a combination thereof, and having oxidation state of +2;

M5 is an element of Group 3, Group 13, or a combination thereof and having an oxidation state of +3;

A4 is an element of Group 4, an element of Group 14, or a combination thereof and having an oxidation state of +4;

A5 is an element of Group 5, an element of Group 15, an element of Group 17, or combination thereof and having an oxidation state of +5, wherein $0 \leq m4 \leq 1$, $0 \leq y4 \leq 1$, and $(m4+y4) > 0$.

Figure 6:
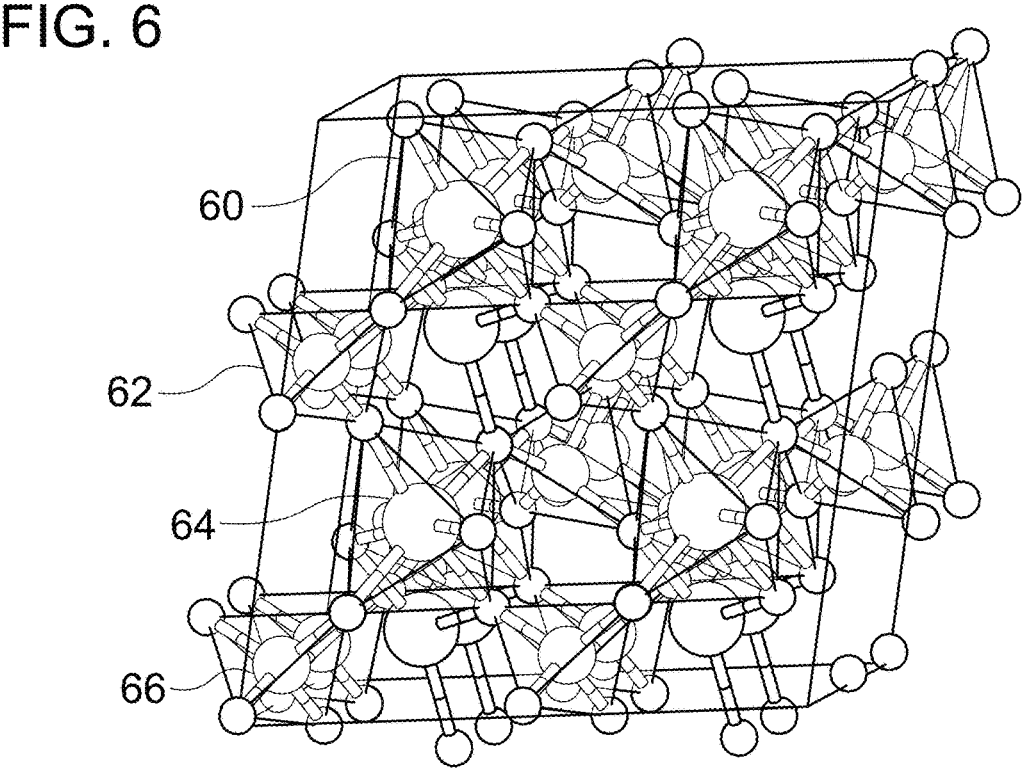
FIG. 6 shows an embodiment of the structure of the solid-ion conductor of Formula 4.

While not wanting to be bound by theory, the solid-state ion conductor of Formula 4 is understood to adopt a structure having a unit cell as shown schematically in FIG. 6, which comprises corner-sharing $M5O_6$ (e.g., $ScO_6$) octahedra 60 and $A5O_4$ (e.g., $AsO_4$) tetrahedra 62. The dopant M4 is understood to substitute on an M5 site 64, and the dopant A4 is understood to substitute for A5 and reside on an A5 site 66. Doping with M4, A4, or a combination thereof is understood to result in improved lithium concentration that permits the lithium to access additional distorted lithium sites within the structure, which in turn is understood to provide reduced activation energy and increased ionic conductivity.

In Formula 4, M4 is an element of Group 2, e.g., Mg, Ca, Ba, or a combination thereof, an element of Group 12, e.g., Zn, or a combination thereof. A combination comprising at least one of the foregoing may be used.

A content m4 of the dopant M4 may be $0.05 \leq m4 \leq 0.8$, $0.1 \leq m4 \leq 0.7$, $0.15 \leq m4 \leq 0.6$, $0.2 \leq m4 \leq 0.5$, or $0.3 \leq m4 \leq 0.4$.

In Formula 4, M5 is an element of Group 3, e.g., Sc, Y, La, or a combination thereof, an element of Group 13, e.g., Al, Ga, In, or a combination thereof. In an aspect, M5 may be a lanthanide, e.g., elements with atomic number 58 (Ce)

to 71 (Lu), or combination thereof. A combination comprising at least one of the foregoing may be used.

In Formula 4, A4 is an element of Group 4, e.g., Ti, Zr, Hf, or a combination thereof, an element of Group 14, e.g., Si, Ge, Sn, or a combination thereof. A combination comprising at least one of the foregoing may be used.

A content y4 of the dopant A4 may be $0.05 \leq y4 \leq 0.8$, $0.1 \leq y4 \leq 0.7$, $0.15 \leq y4 \leq 0.6$, $0.2 \leq y4 \leq 0.5$, or $0.3 \leq y4 \leq 0.4$. Also, as noted above, at least one of M4 and A4 in Formula 4 is present, i.e., (m4+y4)>0.

In Formula 4, the dopant A5 is an element of Group 5, e.g., V, Nb, Ta, or a combination thereof, an element of Group 15, e.g., P, As, Sb, Bi, or a combination thereof, an element of Group 17, e.g., Cl, Br, I, or a combination thereof. A combination comprising at least one of the foregoing may be used.

Mentioned are compounds where M4 is Mg or Zn, $0.25 \leq m4 \leq 0.5$, and y4 is 0, e.g., $Li_{1.25}Sc_{0.75}Mg_{0.25}As_2O_7$, $Li_{1.375}Sc_{0.675}Mg_{0.375}As_2O_7$, $Li_{1.5}Sc_{0.5}Mg_{0.5}As_2O_7$, $Li_{1.375}Sc_{0.675}Zn_{0.375}As_2O_7$, or $Li_{1.5}Sc_{0.5}Zn_{0.5}As_2O_7$.

In an aspect, the solid-state ion conductor comprises a compound of Formula 5:

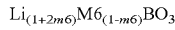　　　　　　　　　　　　　　　Formula 5 wherein, in Formula 5, M6 is an element of Groups 2, 12, or a combination thereof, and has an oxidation state of +2, and 0<m6<1.

Figure 7:
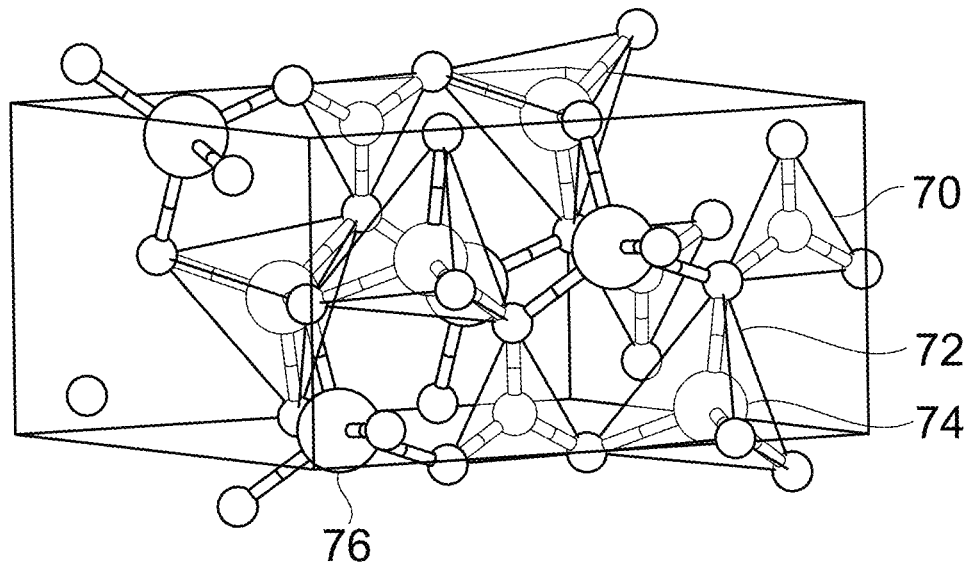
FIG. 7 shows an embodiment of the structure of the solid-ion conductor of Formula 5.

While not wanting to be bound by theory, the solid-state ion conductor of Formula 5 is understood to adopt a structure having a unit cell as shown schematically in FIG. 7, which comprises corner-sharing $BO_3$ planar triangles 70 and $M6O_4$ tetrahedra 72. Providing vacancies in M6 74, e.g., Zn, is understood to permit inclusion of additional Li. The additional lithium is understood to reside on a combination of the M6 and additional distorted lithium sites in the structure, providing the observed reduced activation energy and increased ionic conductivity.

In an aspect, M6 is an element of Group 2, e.g., Mg, Ca, Sr, or a combination thereof, or an element of Group 12, e.g., Zn. A combination comprising at least one of the foregoing may be used.

In Formula 5, m6 may be 0.01<m6<1, 0.02<m6<0.8, 0.05<m6<0.6, or 0.1<m6<0.5. Mentioned are compounds where M6 is Zn and m6 is 0.125, e.g., $Li_{1.25}Zn_{0.875}BO_3$.

In an aspect, the solid-state ion conductor comprises a compound of Formula 6:

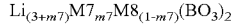　　　　　　　　　　　　　　Formula 6 wherein, in Formula 6,

M7 is an element of Groups 2, 12, or a combination thereof and has an oxidation state of +2, M8 is an element of Groups 3, 13, or a combination thereof and has an oxidation state of +3, and wherein 0<m7<1.

Figure 8:
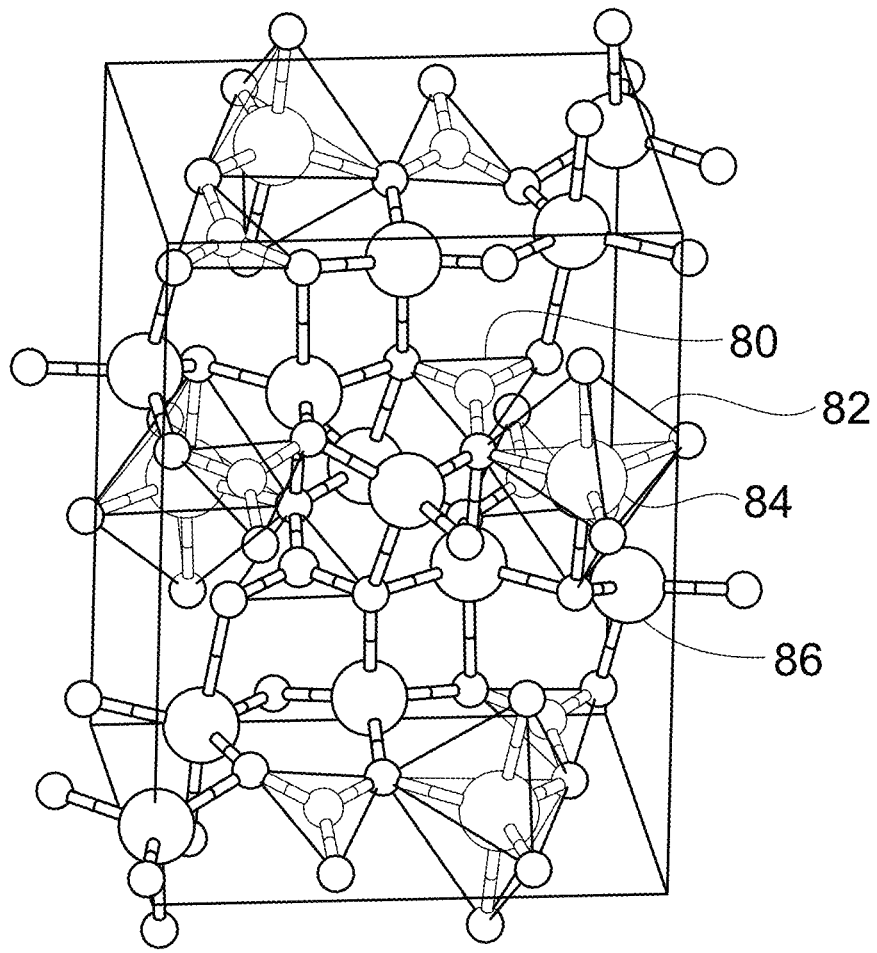
FIG. 8 shows an embodiment of the structure of the solid-ion conductor of Formula 6.

While not wanting to be bound by theory, the solid-state ion conductor of Formula 6 is understood to adopt a structure having a unit cell as shown schematically in FIG. 8, which comprises corner-sharing $BO_3$ planar triangles 80 and $M8O_6$ (e.g., $InO_6$) octahedra 72. The dopant M7 is understood to substitute on an M8 site 84. Also shown in FIG. 8 is Li 86. Doping with M7 is understood to result in improved lithium concentration that permits the lithium to access additional distorted lithium sites, which is understood to provide reduced activation energy and increased ionic conductivity.

In Formula 6, M7 is an element of Group 2, e.g., Mg, Ca, Ba, or a combination thereof, or an element of Group 12, e.g., Zn. A combination comprising at least one of the foregoing may be used.

In Formula 6, M8 is an element of Group 3, e.g., Sc, Y, La, or a combination thereof, or an element of Group 13, e.g., Al, Ga, In, or a combination thereof. In an aspect, M8 may be a lanthanide, e.g., elements with atomic number 58 (Ce) to 71 (Lu), or combination thereof. A combination comprising at least one of the foregoing may be used.

A content m7 of the dopant M7 may be $0.001 \leq m7 \leq 0.8$, $0.005 \leq m7 < 0.7$, $0.01 \leq m7 \leq 0.6$, $0.05 \leq m7 \leq 0.5$, or $0.1 \leq m7 \leq 0.3$. Mentioned are compounds where M7 is Zn and M8 is In, and m7 is $0.1 \leq m7 \leq 0.3$, e.g., $Li_{3.125}In_{0.875}ZnO_{0.125}(BO_3)_2$.

In an aspect, the solid-state ion conductor comprises a compound of Formula 7:

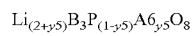　　　　　　　　　　　　　　Formula 7 wherein, in Formula 7, the dopant A6 is an element of Groups 4, 14, or a combination thereof, and has an oxidation state of +4, and 0<y5<1.

Figure 9:
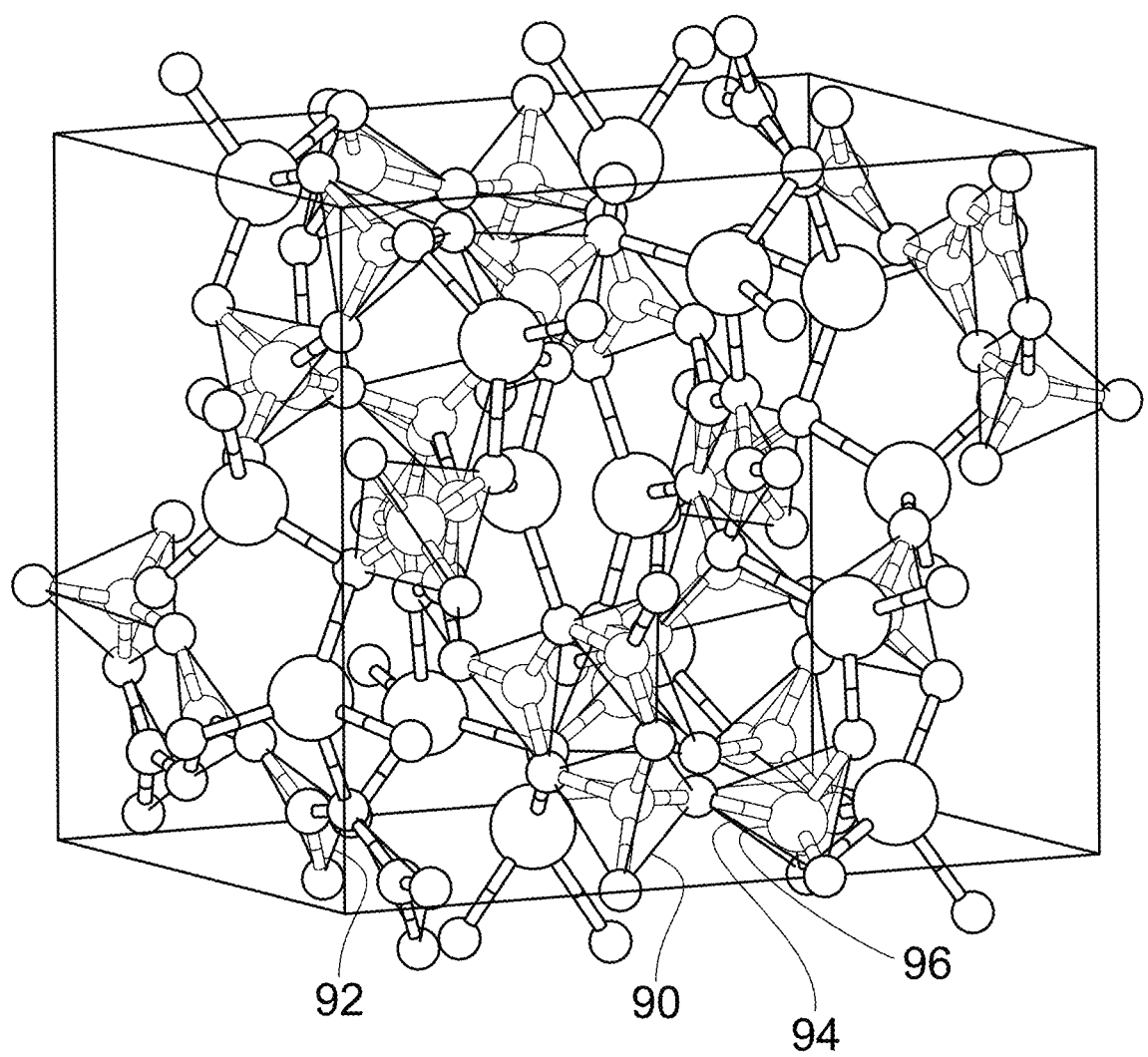
FIG. 9 shows an embodiment of the structure of the solid-ion conductor of Formula 7.

While not wanting to be bound by theory, the solid-state ion conductor of Formula 7 is understood to adopt a structure having a unit cell as shown schematically in FIG. 9, which comprises corner-sharing $BO_4$ tetrahedra 90, $BO_3$ planar triangles 92, and $PO_4$ tetrahedra 94. The dopant A6, e.g., Si, is understood to substitute for P and reside on a P site 96. Doping with A6 is understood to result in improved lithium concentration that permits the lithium to access additional distorted lithium sites, which is understood to cause reduced activation energy and increased ionic conductivity.

In an aspect, A6 is an element of Group 4, e.g., Ti, Zr, Hf, or a combination thereof, or is an element of Group 14, e.g., Si, Ge, Sn, or a combination thereof. A combination comprising at least one of the foregoing may be used.

In Formula 7, a content y5 of the dopant A6 is 0<y5<1, and may be 0.01<y5<1, 0.02<y5<0.8, 0.05<y5<0.6, or 0.1<y5<0.3. Mentioned are compounds where A6 is Si and 0.1<y5<0.3, e.g., $Li_{2.125}B_3P_{0.875}SiO_{125}O_8$.

The solid-state ion conductor may have an ionic conductivity equal to or greater than of $1 \times 10^{-7}$ siemens per centimeter (S/cm), at 23° C. For example, the solid-state ion conductor may have an ionic conductivity of $1 \times 10^{-6}$ S/cm to $1 \times 10^{-2}$ S/cm, $1 \times 10^{-6}$ S/cm to $1 \times 10^{-1}$ S/cm $1 \times 10^{-5}$ S/cm to $5 \times 10^{-2}$ S/cm, or $1 \times 10^{-4}$ S/cm to $1 \times 10^{-2}$ S/cm, at 23° C. Ionic conductivity may be determined by a complex impedance method at 23° C., further details of which can be found in J.-M. Winand et al., "Measurement of Ionic Conductivity in Solid Electrolytes," Europhysics Letters, vol. 8, no. 5, p. 447-452, 1989, the content of which is incorporated herein by reference in its entirety.

A method for the manufacture of the solid-state ion conductor is also disclosed. The solid-state ion conductor may be prepared a solid state synthesis method. For example, the solid-state ion conductor may be prepared by contacting precursor compounds, e.g., a carbonate, oxide, phosphate, sulfate, or borate, in stoichiometric amounts to provide a mixture having a suitable stoichiometry of the elements of the product solid-state ion conductor, and then treating the mixture to provide the solid-state ion conductor. The treating may comprise heat-treating, or mechanochemically milling, e.g., ball milling, for example. The heat-treating may use any suitable atmosphere, such as air, nitrogen, argon, helium, or a combination thereof, at a suitable temperature, such as 500° C. to 1000° C., 600° C.

to 800° C., for a time effective to provide the solid-state ion conductor, e.g., 1 to 20 hours, 2 to 15 hours, or 3 to 10 hours. The mechanochemically milling can be conducted under any suitable atmosphere, e.g., in air, using any suitable medium, e.g., using zirconia balls in a stainless steel container. Use of milling for 1 to 100 hours, or 10 to 30 hours, at 200 to 1000 RPM, 225 to 600 RPM, or 250 to 450 RPM is mentioned. Additional details of the method can be determined by one of skill in the art without undue expectation.

The disclosed method provides the solid-state ion conductor having desirable ionic conductivity and stability, e.g., stability between 1.5 volts (V versus $Li/Li^+$) to 5 V, e.g., 1.75 V to 4.8 V, 2 V to 4.6V, or 2.5 V to 4.4 V, versus $Li/Li^+$. In an embodiment, the solid-state ion conductor is at least kinetically stable when contacted with a lithium transition metal oxide positive electrode active material, such as lithium nickel cobalt manganese oxide or lithium nickel cobalt aluminum oxide, a lithium transition metal phosphate positive electrode active material, such as lithium iron phosphate, or is at least kinetically stable when contacted with lithium metal, e.g., the solid-state ion conductor does not form an alloy or compound when contacted with lithium metal.

Figure 10A:
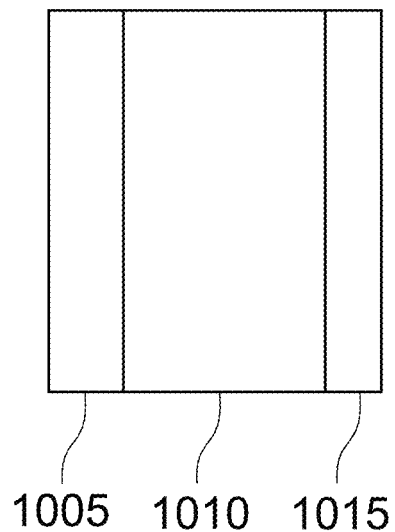
FIG. 10A shows an embodiment of a protected positive electrode.

The solid-state ion conductor can be disposed on a positive active material layer to provide a protected positive electrode, shown schematically in FIG. 10A, which includes a current collector 1005, a positive active material layer 1010 and protection layer 1015 comprising the solid-state ion conductor on the positive active material layer. While not wanting to be bound by theory, it is understood that use of the protection layer comprising the solid-state ion conductor can avoid degradation of the positive active material, resulting in improved performance. The protection layer may be disposed on the positive active material layer by sputtering, for example.

Figure 10B:
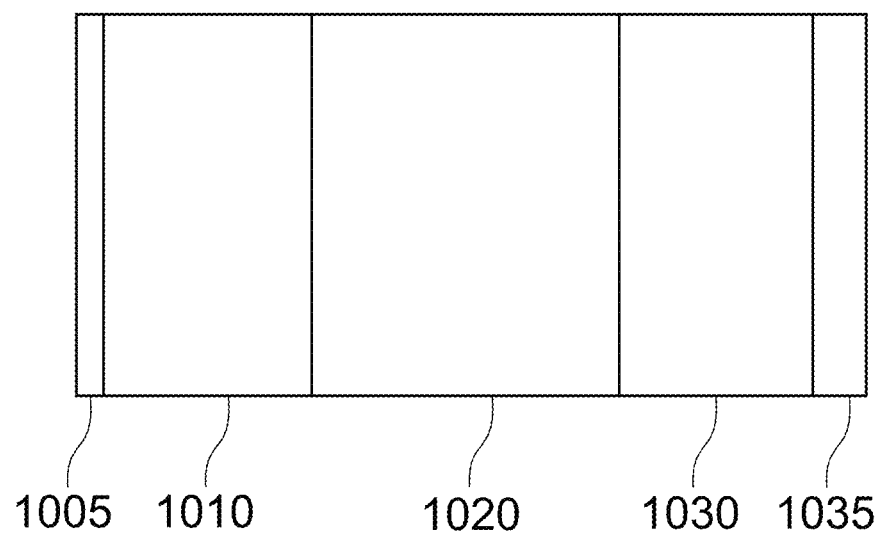
FIG. 10B shows an embodiment of a lithium battery.

The solid-state ion conductor can be disposed between the positive electrode and the negative electrode of a lithium battery and can serve as a solid electrolyte in the lithium battery, shown schematically in FIG. 10B. Included in the lithium battery shown in FIG. 10B is a positive electrode comprising a positive active material layer 1010 on a positive current collector 1005, an electrolyte layer 1020, and a negative electrode comprising a negative active material layer 1030 on negative current collector 1035. It is understood that the positive electrode could alternatively be referred to as a cathode, and the negative electrode as an anode. The electrolyte layer may comprise the solid-state ion conductor. In an aspect, the electrolyte layer is suitably electrically insulating to serve as a separator to electrically isolate the positive electrode from the negative electrode. For the positive current collector aluminum or stainless steel may be used, and for the negative current collector copper, stainless steel, or titanium may be used.

The lithium battery can be manufactured by providing the positive electrode, disposing the solid-state ion conductor on the positive electrode, e.g., by sputtering, to provide an electrolyte layer, and then disposing the negative electrode on the electrolyte layer. The resulting structure may be wound or folded, and disposed in a cylindrical or rectangular case or pouch to contain the lithium battery.

The electrolyte layer may alternatively or additionally comprise a solid electrolyte other than or in addition to the solid-state ion conductor. The solid electrolyte may comprise, for example, an oxide-containing solid electrolyte or a sulfide-containing solid electrolyte.

Examples of the oxide-containing solid electrolyte may include $Li_{1+x+y}Al_xTi_{2-x}Si_yP_{3-y}O_{12}$ (where $0<x<2$ and $0 \leq y<3$), $BaTiO_3$, $Pb(Zr_aTi_{1-a})O_3$ (PZT) where $0 \leq a \leq 1$, $Pb_{1-x}La_xZr_{1-y}Ti_yO_3$ (PLZT) where $0 \leq x<1$ and $0 \leq y<1$, $Pb(Mg_{1/3}Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $Li_3PO_4$, $Li_xTi_y(PO_4)_3$ (where $0<x<2$ and $0<y<3$), $Li_xAl_yTi_z(PO_4)_3$ where $0<x<2$, $0<y<1$, and $0<z<3$, $Li_{1+x+y}(Al_aGa_{1-a})_x(Ti_bGe_{1-b})_{2-x}Si_yP_{3-y}O_{12}$ where $0 \leq x \leq 1$, $0 \leq y \leq 1$, $0 \leq a \leq 1$, and $0 \leq b \leq 1$, $Li_xLa_yTiO_3$ where $0<x<2$ and $0<y<3$, $Li_2O$, $LiOH$, $Li_2CO_3$, $LiAlO_2$, $Li_2O$—$Al_2O_3$—$SiO_2$—$P_2O_5$—$TiO_2$—$GeO_2$, or $Li_{3+x}La_3M_2O_{12}$ where M is Te, Nb, or Zr, and $0 \leq x \leq 10$. Also mentioned is $Li_7La_3Zr_2O_{12}$ (LLZO) or $Li_{3+x}La_3Zr_{2-a}Me_aO_{12}$ (e.g., Me-doped LLZO, where Me is Ga, W, Nb, Ta, or Al, and $0 \leq x \leq 10$ and $0 \leq a<2$). A combination comprising at least one of the foregoing may be used.

Examples of the sulfide-containing solid electrolyte may include $Li_2S$—$P_2S_5$, $Li_2S$—$P_2S_5$—LiX (where X is a halogen element), $Li_2S$—$P_2S_5$—$Li_2O$, $Li_2S$—$P_2S_5$—$Li_2O$—LiI, $Li_2S$-$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ where m and n each are a positive number, Z represents any of Ge, Zn, and Ga, $Li_2S$—$GeS_2$, $Li_2S$—$SiS_2$—$Li_3PO_4$, $Li_2S$—$SiS_2$—$Li_pMeO_q$ (where p and q each are a positive number, Me represents at least one of P, Si, Ge, B, Al, Ga, or In), $Li_{7-x}PS_{6-x}Cl_x$ (where $0 \leq x \leq 2$), $Li_{7-x}PS_{6-x}Br_x$ (where $0 \leq x \leq 2$), or $Li_{7-x}PS_{6-x}I_x$ (where $0 \leq x \leq 2$). The sulfide-containing solid electrolyte may include at least sulfur (S), phosphorus (P), and lithium (Li), as component elements among the sulfide-containing solid electrolyte materials. For example, the sulfide-containing solid electrolyte may be a material including $Li_2S$—$P_2S_5$. Here, when the material including $Li_2S$—$P_2S_5$ is used as a sulfide-containing solid electrolyte material, a molar ratio of $Li_2S$ and $P_2S_5$ ($Li_2S$:$P_2S_5$) may be, for example, selected in a range of about 50:50 to about 90:10. The sulfide-containing solid electrolyte may also comprise an argyrodite-type solid electrolyte, such as $Li_{7-x}PS_{6-x}Cl_x$ (where $0 \leq X \leq 2$), $Li_{7-x}PS_{6-x}Br_x$ (where $0 \leq x \leq 2$), or $Li_{7-x}PS_{6-x}I_x$ (where $0 \leq x \leq 2$), e.g., $Li_6PS_5Cl$, $Li_6PS_5Br$, or $Li_6PS_5I$.

The electrolyte layer comprising the solid-state ion conductor may be non-porous, or have a porosity of 0% (no pores) to 25%, based on a total volume of the electrolyte layer. The porosity may be, for example, 0% to 25%, 1% to 20%, 5% to 15%, or 7% to 12%, based on a total volume of the electrolyte layer. The porosity of electrolyte layer may be determined by scanning electron microscopy, the details of which can be determined by one of skill in the art without undue experimentation. Alternatively, porosity may be determined using nitrogen isotherms as disclosed in E. P. Barrett, L. G. Joyner, P. P. Halenda, "The determination of pore volume and area distributions in porous substances. I. Computations from nitrogen isotherms," J. Am. Chem. Soc. (1951), 73,373-380, the details of which can be determined by one of skill in the art without undue experimentation.

In an aspect, the electrolyte layer is porous, and an ionic liquid, a polymer-ionic liquid, a liquid electrolyte comprising a lithium salt and an organic solvent, or a combination thereof is disposed in a pore of the electrolyte layer to provide a hybrid electrolyte.

The ionic liquid (e.g., molten salt) may comprise i) an ammonium cation, a pyrrolidinium cation, a pyridinium cation, a pyrimidinium cation, an imidazolium cation, a piperidinum cation, a pyrazolium cation, an oxazolium cation, a pyridazinium cation, a phosphonium cation, a sulfonium cation, a triazolium cation, or a combination thereof, and ii) an anion, e.g., $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $SO_4^{2-}$, $CF_3SO_3^-$, $(FSO_2)_2N^-$, $(C_2F_5SO_2)_2N^-$, $(C_2F_5SO_2)(CF_3SO_2)N^-$, $(CF_3SO_2)_2N^-$, or a combination thereof. Examples of the ionic liquid include N-methyl-N-propylpyrrolidinium bis(trifluoromethylsulfonyl)imide, N-butyl-N-methyl-pyrrolidinium bis(trifluoromethylsulfonyl)imide, 1-butyl-3-methyl-imidazolium bis(trifluoromethylsulfonyl)imide, 1-ethyl-3-methyl-imidazolium bis(trifluoromethylsulfonyl)imide, or a combination thereof.

The polymer ionic liquid may be a polymerization product of ionic liquid monomers, or a polymeric compound. The polymer ionic liquid may include a repeating unit that includes i) an ammonium cation, a pyrrolidinium cation, a pyridinium cation, a pyrimidinium cation, an imidazolium cation, a piperidinum cation, a pyrazolium cation, an oxazolium cation, a pyridazinium cation, a phosphonium cation, a sulfonium cation, a triazolium cation, or a combination thereof, and ii) an anion, e.g., $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N$, $(FSO_2)_2N$, Cl, Br, I, $SO_4^{2-}$, $CF_3SO_3$, $(C_2F_5SO_2)_2N^-$, $(C_2F_5SO_2)(CF_3SO_2)N^-$, $NO_3^-$, $Al_2Cl_7^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO-$, or a combination thereof.

For the liquid electrolyte comprising a lithium salt and an organic solvent, the lithium salt may be a lithium salt of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $(FSO_2)_2N^-$, Cl$^-$, Br$^-$, I$^-$, $SO_4^{2-}$, $CF_3SO_3^-$, $(C_2F_5SO_2)_2N^-$, $(C_2F_5SO_2)(CF_3SO_2)N^-$, $NO_3^-$, $Al_2Cl_7^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2C^-$, $(CF_3SO_2)_2CH^-$, $(SF_5)_3C^-$, $(O(CF_3)_2C_2(CF_3)_2O)_2PO$, or a combination thereof. The organic solvent may comprise a carbonate such as propylene carbonate, ethylene carbonate, fluoroethylene carbonate, butylene carbonate, dimethyl carbonate, diethyl carbonate, methyl ethyl carbonate, or a combination thereof.

The electrolyte layer may further comprise a separator film. The separator film may be electrically insulating, and may comprise polyethylene, polypropylene, polyvinylidene fluoride, or a combination thereof. For example, the separator film may be a multilayer separator film, such as a two-layer separator of polyethylene/polypropylene, a three-layer separator of polyethylene/polypropylene/polyethylene, or a three-layer separator of polypropylene/polyethylene/polypropylene. The separator film may have a pore diameter of 0.01 μm to 10 μm, and a thickness of 5 μm to 20 μm. If present, the liquid electrolyte, ionic liquid, or polymer ionic-liquid electrolyte may be disposed in a pore of the separator film.

In some embodiments, other electrolytes, including a liquid electrolyte or ionic-liquid (e.g., molten salt) electrolyte can be excluded from the disclosed electrolyte layer.

The electrolyte layer may have any suitable thickness. A thickness of the solid electrolyte layer may be 1 to 300 μm, 2 to 100 μm, or 30 to 60 μm.

The positive electrode comprises a positive active material layer comprising a lithium transition metal oxide, a lithium transition metal phosphate, or a combination thereof. For example, the positive active material can be a compound represented by any of $Li_aM^1_{1-b}M^2_bD_2$ wherein $0.90 \leq a \leq 1.8$ and $0 \leq b \leq 0.5$; $Li_aE_{1-b}M^2_bO_{2-c}D_c$ wherein $0.90 \leq a \leq 1.8$, $0 \leq b \leq 0.5$, and $0 \leq c \leq 0.05$; $LiE_{2-b}M^2_bO_{4-c}D_c$ wherein $0 \leq b \leq 0.5$ and $0 \leq c \leq 0.05$; $Li_aNi_{1-b-c}Co_bM^2_cD_\alpha$ wherein $0.90 \leq a \leq 1.8$, $0 \leq b \leq 0.5$, $0 \leq c \leq 0.05$, and $0 \leq \alpha \leq 2$; $Li_aNi_{1-b-c}Co_bM^2_cO_{2-\alpha}X_\alpha$ wherein $0.90 \leq a \leq 1.8$, $0 \leq b \leq 0.5$, $0 \leq c \leq 0.05$, and $0 < \alpha < 2$; $Li_aNi_{1-b-c}Co_bM^2_cO_{2-\alpha}X_2$ wherein $0.90 \leq a \leq 1.8$, $0 \leq b \leq 0.5$, $0 \leq c \leq 0.05$, and $0 < \alpha < 2$; $Li_aN_{1-b-c}Mn_bM^2_cD_\alpha$ wherein $0.90 \leq a \leq 1.8$, $0 \leq b \leq 0.5$, $0 \leq c \leq 0.05$, and $0 < \alpha \leq 2$; $Li_aNi_{1-b-c}Mn_bM^2_cO_{2-\alpha}X_\alpha$ wherein $0.90 \leq a \leq 1.8$, $0 \leq b \leq 0.5$, $0 \leq c \leq 0.05$, and $0 < \alpha < 2$; $Li_aNi_{1-b-c}Mn_bM^2_cO_{2-\alpha}X_2$ wherein $0.90 \leq a \leq 1.8$, $0 \leq b \leq 0.5$, $0 \leq c \leq 0.05$, and $0 < \alpha < 2$; $Li_aNi_bE_cG_dO_2$ wherein $0.90 \leq a \leq 1.8$, $0 \leq b \leq 0.9$, $0 \leq c \leq 0.5$, and $0.001 \leq d \leq 0.1$; $Li_aNi_bCo_cMn_dGeO_2$ wherein $0.90 \leq a \leq 1.8$, $0 \leq b \leq 0.9$, $0 \leq c \leq 0.5$, $0 \leq d \leq 0.5$, and $0.001 \leq e \leq 0.1$; $Li_aNiG_bO_2$ wherein $0.90 \leq a \leq 1.8$ and $0.001 \leq b \leq 0.1$; $Li_aCoG_bO_2$ wherein $0.90 \leq a \leq 1.8$ and $0.001 \leq b \leq 0.1$; $Li_aMnG_bO_2$ where $0.90 \leq a \leq 1.8$ and $0.001 \leq b \leq 0.1$; $Li_aMn_2G_bO_4$ wherein $0.90 \leq a \leq 1.8$ and $0.001 \leq b \leq 0.1$; $QO_2$; $QS_2$; $LiQS_2$; $V_2O_5$; $LiV_2O_2$; $LiRO_2$; $LiNiVO_4$; $Li_{(3-f)}J_2(PO_4)_3$ ($0 \leq f \leq 2$); $Li_{(3-f)}Fe_2(PO_4)_3$ wherein $0 \leq f \leq 2$; or $LiFePO_4$, in which in the foregoing positive active materials $M^1$ is Ni, Co, or Mn; $M^2$ is Al, Ni, Co, Mn, Cr, Fe, Mg, Sr, V, or a rare-earth element; D is O, F, S, or P; E is Co or Mn; X is F, S, or P; G is Al, Cr, Mn, Fe, Mg, La, Ce, Sr, or V; Q is Ti, Mo or Mn; R is Cr, V, Fe, Sc, or Y; and J is V, Cr, Mn, Co, Ni, or Cu. Examples of the positive active material include $LiCoO_2$, $LiMn_xO_{2x}$ where x=1 or 2, $LiNi_{1-x}Mn_xO_{2x}$ where 0<x<1, $LiNi_{1-x-y}Co_xMn_yO_2$ where $0 \leq x \leq 0.5$ and $0 \leq y \leq 0.5$, $LiFePO_4$, $TiS_2$, $FeS_2$, $TiS_3$, or $FeS_3$. For example, the positive active material may comprise NMC 811 ($LiNi_{0.8}Mn0.1Co_{0.1}O_2$), NMC 622 ($LiNi_{0.6}Mn_{0.2}Co_{0.2}O_2$), NMC 532 ($LiNi_{0.5}Mn_{0.3}Co_{0.2}O_2$), or NCA ($LiNi_{0.8}Co_{0.15}Al_{0.05}O_2$)

The positive active material layer may further include a binder. A binder can facilitate adherence between components of the positive active material layer, and adherence of the positive active material layer to the current collector. Examples of the binder can include polyacrylic acid (PAA), polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene monomer (EPDM), sulfonated EPDM, styrene-butadiene-rubber, fluorinated rubber, a copolymer thereof, or a combination thereof. The amount of the binder can be in a range of about 1 part by weight to about 10 parts by weight, for example, in a range of about 2 parts by weight to about 7 parts by weight, based on a total weight of the positive active material. When the amount of the binder is in the range above, e.g., about 1 part by weight to about 10 parts by weight, the adherence of the electrode to the current collector may be suitably strong.

The positive active material layer may further include a conductive agent. Any suitable conductive agent may be used. The conductive agent may comprise a carbon, a metal, or an oxide. The carbon may comprise carbon black, carbon fiber, graphite, carbon nanotubes, graphene, or a combination thereof. The carbon black can be, for example, acetylene black, Ketjen black, Super P carbon, channel black, furnace black, lamp black, thermal black, or a combination thereof. The graphite can be a natural graphite or an artificial graphite. The metal may comprise a metal element, e.g., nickel, and may by in the form of a fiber or powder, such as aluminum powder or a nickel powder. The conductive agent may comprise an oxide, such as a zinc oxide or a potassium titanate; or a conductive polymer, such as a polyethylene oxide or a polyphenylene derivative. A combination comprising at least one of the foregoing conductive agents may be used. An amount of the conducting agent may be from about 1 part by weight to about 10 parts by weight, for example, from about 2 parts by weight to about 5 parts by weight, based on 100 parts by weight of the total weight of the positive active material.

The positive active material layer may further comprise the solid-ion conductor, or alternatively or additionally comprise a solid electrolyte other than or in addition to the solid-state ion conductor. The solid electrolyte may comprise, for example, the oxide-containing solid electrolyte, the sulfide-containing solid electrolyte, or a combination thereof.

The positive active material layer may be disposed on the surface of a substrate, e.g., an aluminum foil current collector, using any suitable means, for example, using tape casting, slurry casting, or screen printing. Additional details of tape casting and screen printing, for example suitable binders and solvents, can be determined by one of skill in the art without undue experimentation.

The positive active material layer may have any suitable thickness, e.g., a thickness of 1 to 300 μm, 2 μm to 100 μm, or 30 to 60 μm.

The negative electrode may comprise a negative active material layer on a current collector. The negative active material layer may comprise carbon, a non-transition metal oxide, lithium metal, a lithium metal alloy, or a combination thereof. The carbon may comprise natural graphite or artificial graphite, each of which may be crystalline or amorphous. Examples of the amorphous carbon include soft carbon, hard carbon, mesocarbon, mesophase pitch carbon, and calcined coke. The non-transition metal oxide may comprise $SnO_2$ or $SiO_x$ where $0<x\leq2$. The lithium metal alloy for the negative electrode may include lithium, and a metal or metalloid alloyable with lithium. Examples of the metal or metalloid alloyable with lithium include Si, Sn, Al, Ge, Pb, Bi, Sb, a Si—Y' alloy (wherein Y' is at least one of an alkali metal, an alkaline earth metal, a Group 13 to Group 16 element, a transition metal, or a rare earth element, except for Si), or a Sn—Y' alloy (wherein Y' is at least one of an alkali metal, an alkaline earth metal, a Group 13 to Group 16 element, a transition metal, or a rare earth element, except for Sn). Y' may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Jr, Pd, Pt, Cu, Ag, Au, Zn, Cd, B, Al, Ga, Sn, In, Ge, P, As, Sb, Bi, S, Se, Te, Po, or a combination thereof.

This disclosure is further illustrated by the following examples, which are non-limiting.

EXAMPLES

Prophetic Example 1

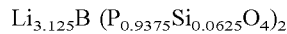

Figure 11:
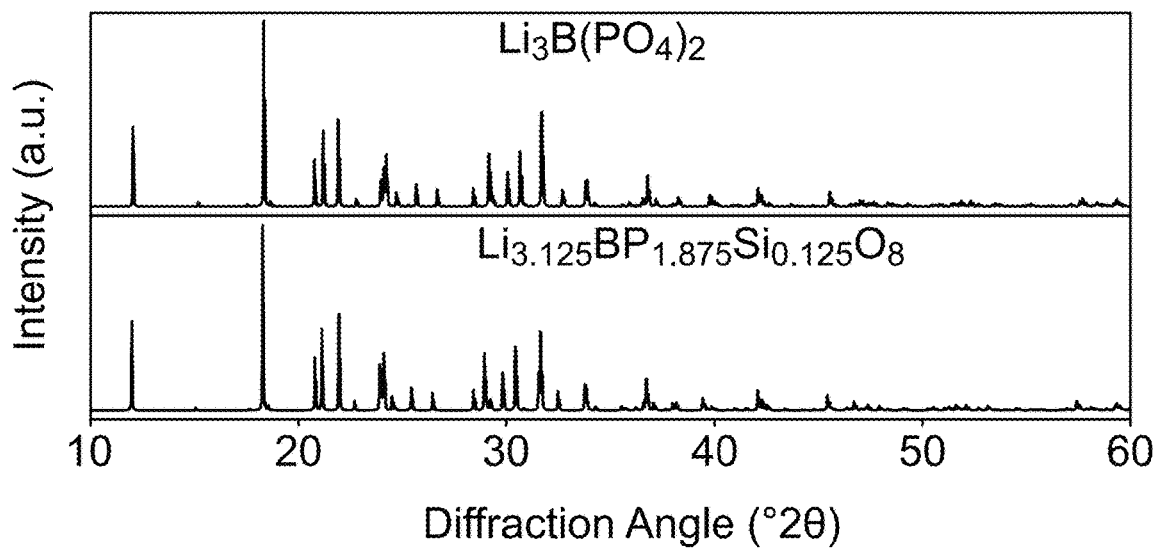
FIG. 11 is a graph of intensity (arbitrary units, a.u.) versus diffraction angle (degrees 2θ) showing a calculated X-ray diffraction (XRD) pattern for the $Li_{3.125}B(P_{0.9375}Si_{0.0625}O_4)_2$ of Prophetic Example 1 and a calculated XRD pattern for $Li_3B(PO_4)_2$.

Stoichiometric amounts of lithium phosphate, silicon dioxide, and lithium borate will be combined to provide a mixture. The mixture will be ball-milled in a zirconia container using zirconia balls in air at 400 RPM for 100 hours to provide $Li_{3.125}B(P_{0.9375}Si_{0.0625}O_4)_2$. The product will be analyzed by X-ray powder diffraction using CuKα radiation, the results of which are shown in FIG. 11. Also shown in FIG. 11 for reference is a calculated XRD spectrum for $Li_3B(PO_4)_2$. The XRD results shown in FIG. 11 are consistent with $Li_{3.125}B(P_{0.9375}Si_{0.0625}O_4)_2$.

Figure 12:
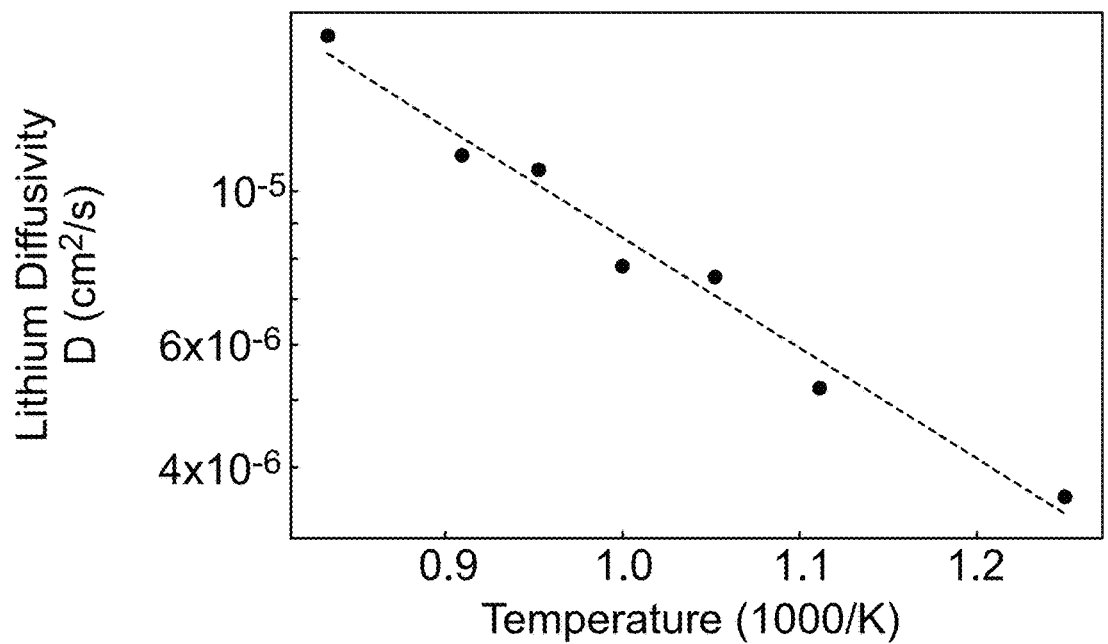
FIG. 12 is a graph of lithium diffusivity (cm$^2$/s) versus temperature (K$^{-1}$) showing the results of Arrhenius analysis of the $Li_{3.125}B(P_{0.9375}Si_{0.0625}O_4)_2$ of Prophetic Example 1.

The lithium conductivity of $Li_{3.125}B(P_{0.9375}Si_{0.0625}O_4)_2$ will be determined in a blocking electrode cell by complex impedance, as described in J.-M. Winand et al., "Measurement of Ionic Conductivity in Solid Electrolytes," Europhysics Letters, vol. 8, no. 5, p. 447-452, 1989, the content of which is incorporated herein by reference in its entirety. Shown in FIG. 12 is an Arrhenius plot of the results determined by AIMD, indicating an activation energy of 0.32 eV and a conductivity of 0.22 millisiemens per centimeter (mS/cm) at 27° C. AIMD is described in Ong, S. P. et al. Phase stability, electrochemical stability and ionic conductivity of the Li 10±1 MP 2×12 (M=Ge, Si, Sn, Al or P, and X=O, S or Se) family of superionic conductors. Energ Environ Sci 6, 148-156 (2012), the content of which is incorporated herein by reference in its entirety.

Prophetic Example 2

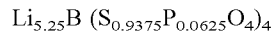

Figure 13:
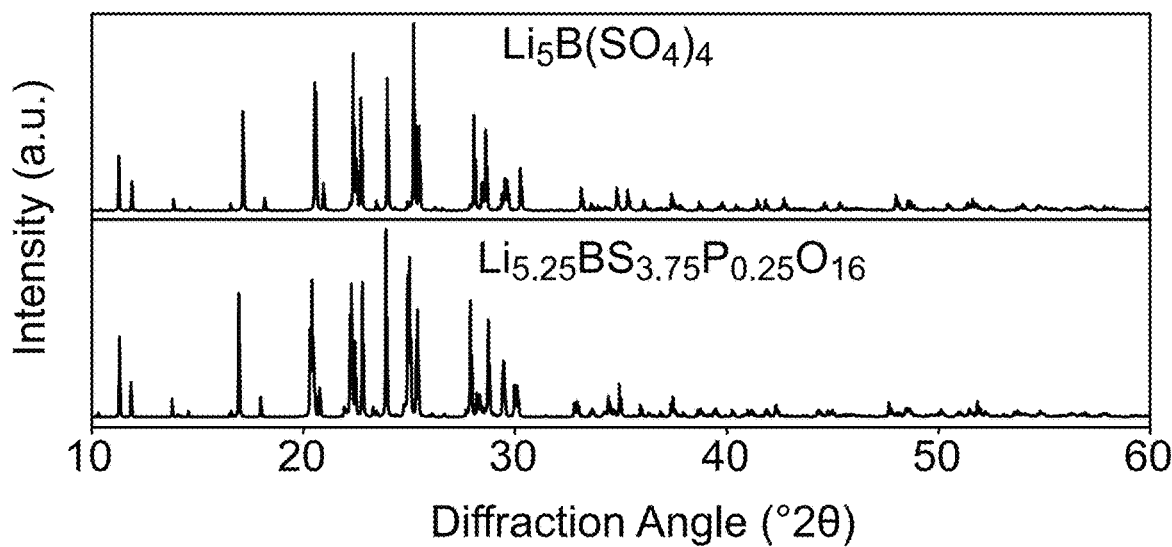
FIG. 13 is a graph of intensity (arbitrary units, a.u.) versus diffraction angle (degrees 2θ) showing a calculated XRD pattern for $Li_{5.25}B(S_{0.9375}P_{0.0625}O_4)_4$ of Prophetic Example 2 and a calculated XRD pattern for $Li_5B(SO_4)_4$.

Stoichiometric amounts of lithium sulphate, lithium phosphate, and lithium borate will be combined to provide a mixture. The mixture will be ball-milled in a stainless steel container using zirconia balls in air at 400 RPM for 100 hours to provide $Li_{5.25}B(S_{0.9375}P_{0.0625}O_4)_4$. The product will be analyzed by X-ray powder diffraction using CuKα radiation, the results of which are shown in FIG. 13. Also shown in FIG. 13 for reference is a calculated XRD spectrum for $Li_5B(SO_4)_4$. The XRD results shown in FIG. 13 are consistent with $Li_{5.25}B(S_{0.9375}P_{0.0625}O_4)_4$.

Figure 14:
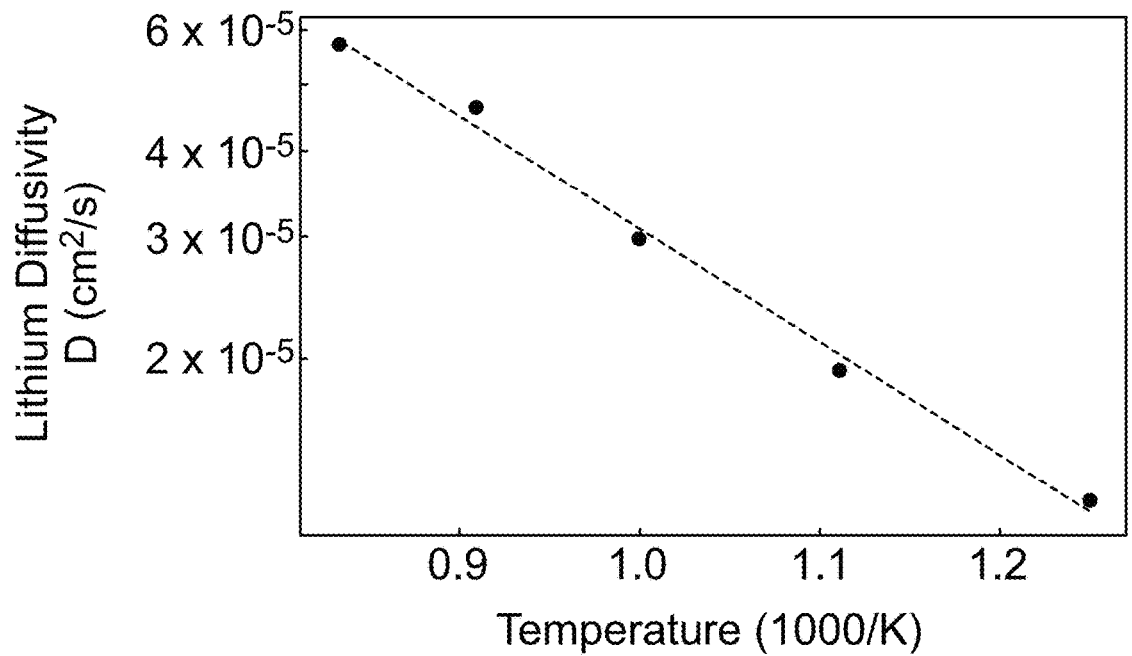
FIG. 14 is a graph of the lithium diffusivity (cm$^2$/s) versus temperature (K$^{-1}$) showing the results of Arrhenius analysis of the $Li_{5.25}B(S_{0.9375}P_{0.0625}O_4)_4$. of Prophetic Example 2.

The lithium conductivity of $Li_{5.25}B(S_{0.9375}P_{0.0625}O_4)_4$ will be determined in a blocking electrode cell by complex impedance, using the same method as in Prophetic Example 1. Shown in FIG. 14 is an Arrhenius plot of the results determined by AIMD, indicating an activation energy of 0.33 eV and a conductivity of 0.46 millisiemens per centimeter (mS/cm) at 27° C.

Comparative Prophetic Example 1

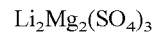

Stoichiometric amounts of lithium sulphate and magnesium sulphate will be combined to provide a mixture. The mixture will be ball-milled in a stainless steel container using zirconia balls in air at 400 RPM for 100 hours to provide $Li_2Mg_2(SO_4)_3$.

Figure 15:
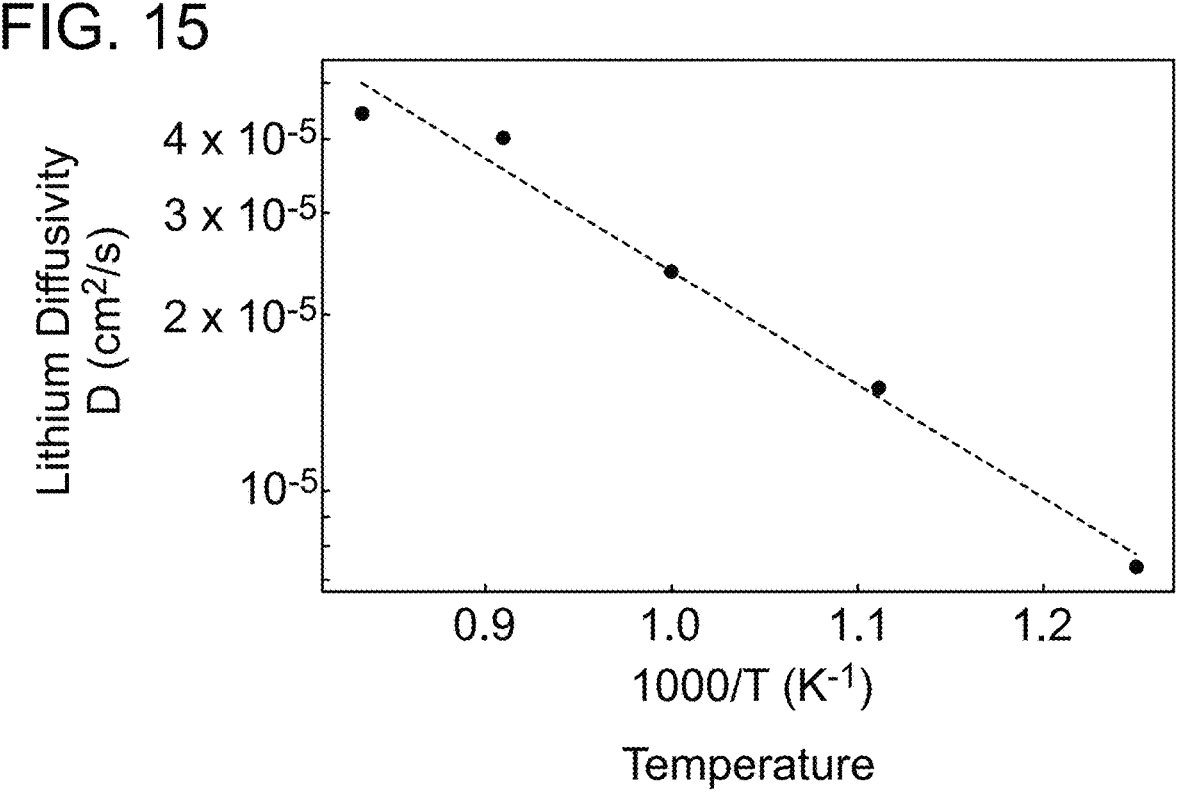
FIG. 15 is a graph of the lithium diffusivity (cm$^2$/s) versus temperature (K$^{-1}$) showing the results of Arrhenius analysis of the Li$_2$Mg$_2$(SO$_4$)$_3$ of Comparative Prophetic Example 1.

The lithium conductivity of $Li_2Mg_2(SO_4)_3$ will be determined in a blocking electrode cell by complex impedance, using the same method as in Prophetic Example 1. Shown in FIG. 15 is an Arrhenius plot of the results determined by AIMD, indicating an activation energy of 0.39 eV and a conductivity of 0.037 millisiemens per centimeter (mS/cm) at 27° C.

Prophetic Example 3

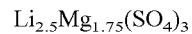

Stoichiometric amounts of lithium sulphate and magnesium sulphate will be combined to provide a mixture. The mixture will be ball-milled in a stainless steel container using zirconia balls in air at 400 RPM for 100 hours to provide $Li_{2.5}Mg_{1.75}(SO_4)_3$.

Figure 16:
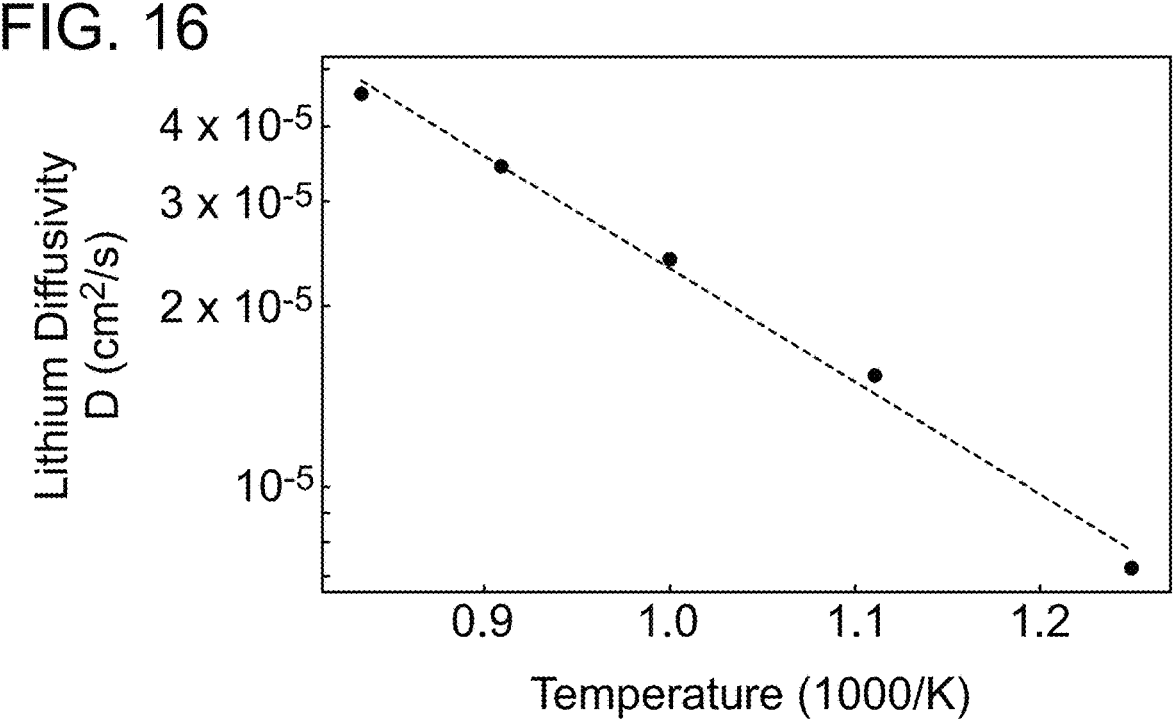
FIG. 16 is a graph of the lithium diffusivity (cm$^2$/s) versus temperature (K$^{-1}$) showing the results of Arrhenius analysis of the Li$_{2.5}$Mg$_{1.75}$(SO$_4$)$_3$ of Prophetic Example 3.

The lithium conductivity of $Li_{2.5}Mg_{1.75}(SO_4)_3$ will be determined in a blocking electrode cell by complex impedance, using the same method as in Prophetic Example 1. Shown in FIG. 16 is an Arrhenius plot of the results determined by AIMD, indicating an activation energy of 0.38 eV and a conductivity of 0.059 millisiemens per centimeter (mS/cm) at 27° C.

Prophetic Example 4

Figure 17:
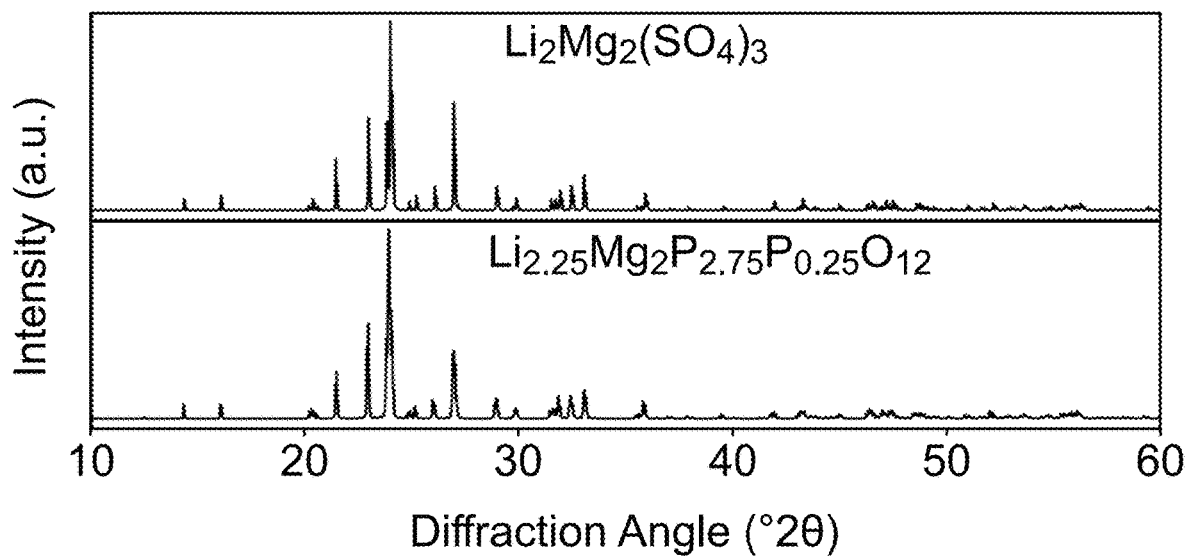
FIG. 17 is a graph of intensity (arbitrary units, a.u.) versus diffraction angle (degrees 2θ) showing a calculated XRD pattern for Li$_{2.25}$Mg$_2$(S$_{0.917}$P$_{0.08304}$)$_3$ of Prophetic Example 4 and a calculated XRD pattern for Li$_2$Mg$_2$(SO$_4$)$_3$.

Stoichiometric amounts of lithium sulphate, magnesium sulphate, and lithium phosphate will be combined to provide a mixture. The mixture will be ball-milled in a stainless steel container using zirconia balls in air at 400 RPM for 100 hours to provide $Li_{2.25}Mg_2(S_{0.917}P_{0.083}O_4)_3$. The product will be analyzed by X-ray powder diffraction using CuKα radiation, the results of which are shown in FIG. 17. Also shown in FIG. 17 for reference is a calculated XRD spectrum for $Li_2Mg_2(SO_4)_3$. The XRD results shown in FIG. 17 are consistent with $Li_{2.25}Mg_2(S_{0.917}P_{0.083}O_4)_3$.

Figure 18:
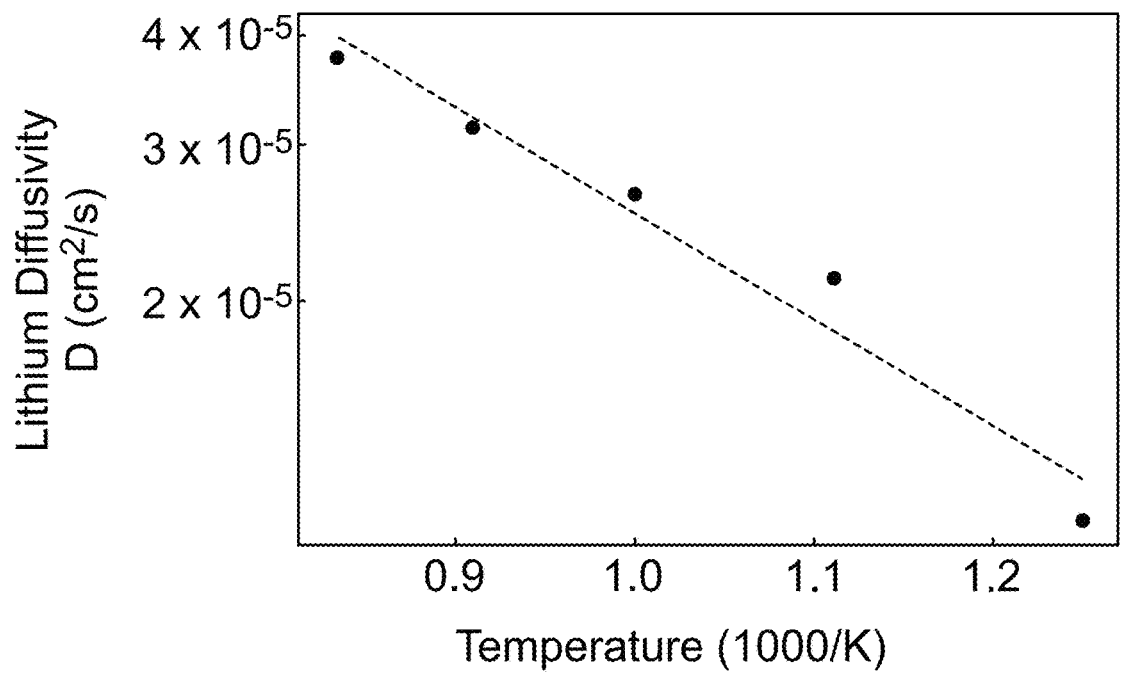
FIG. 18 is a graph of the lithium diffusivity (cm$^2$/s) versus temperature (K$^{-1}$) showing the results of Arrhenius analysis of the Li$_{2.25}$Mg$_2$(S$_{0.917}$P$_{0.083}$O$_4$)$_3$ of Prophetic Example 4.

The lithium conductivity of $Li_{2.25}Mg_2(S_{0.917}P_{0.083}O_4)_3$ will be determined in a blocking electrode cell by complex impedance, using the same method as in Prophetic Example 1. Shown in FIG. 18 is an Arrhenius plot of the results determined by AIMD, indicating an activation energy of 0.24 eV and a conductivity of 2.29 millisiemens per centimeter (mS/cm) at 27° C.

Prophetic Example 5

$Li_{1.375}Sc_{0.675}Mg_{0.375}As_2O_7$

Figure 19:
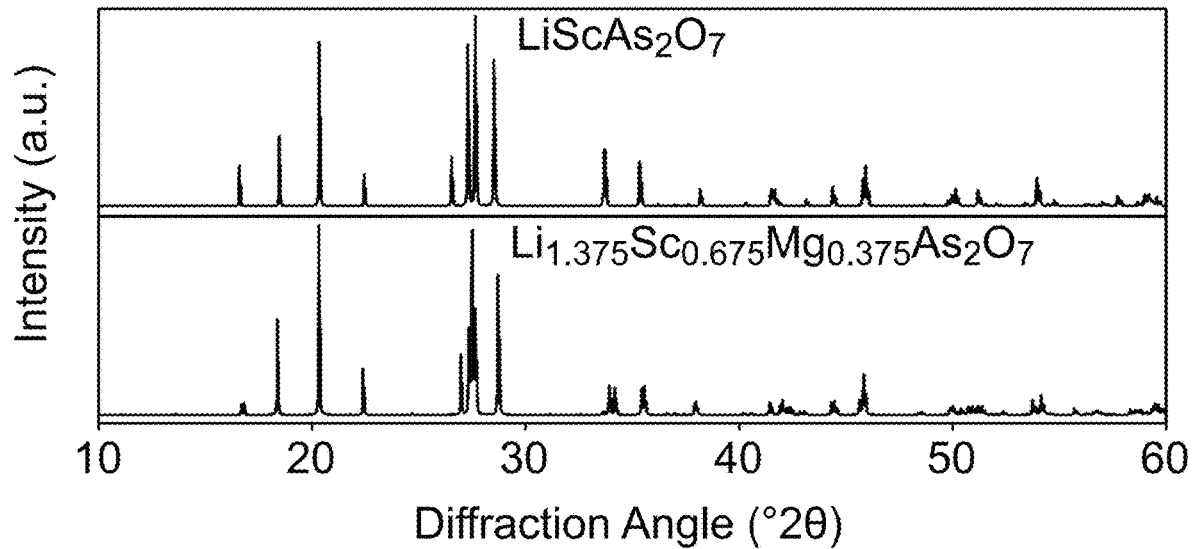
FIG. 19 is a graph of intensity (arbitrary units, a.u.) versus diffraction angle (degrees 2θ) showing a calculated XRD pattern for Li$_{1.375}$Sc$_{0.675}$Mg$_{0.375}$As$_2$O$_7$ of Prophetic Example 5 and a calculated XRD pattern for LiScAs$_2$O$_7$.

Stoichiometric amounts of lithium oxide, magnesium oxide, scandium oxide, and arsenic oxide will be combined to provide a mixture. The mixture will be ball-milled in a stainless steel container using zirconia balls in air at 400 RPM for 100 hours to provide $Li_{1.375}Sc_{0.675}Mg_{0.375}As_2O_7$. The product will be analyzed by X-ray powder diffraction using CuKa radiation, the results of which are shown in FIG. 19. Also shown in FIG. 19 for reference is a calculated XRD spectrum for $Li_2ScAs_2O_7$. The XRD results shown in FIG. 19 are consistent with $Li_{1.375}Sc_{0.675}Mg_{0.375}As_2O_7$.

Figure 20:
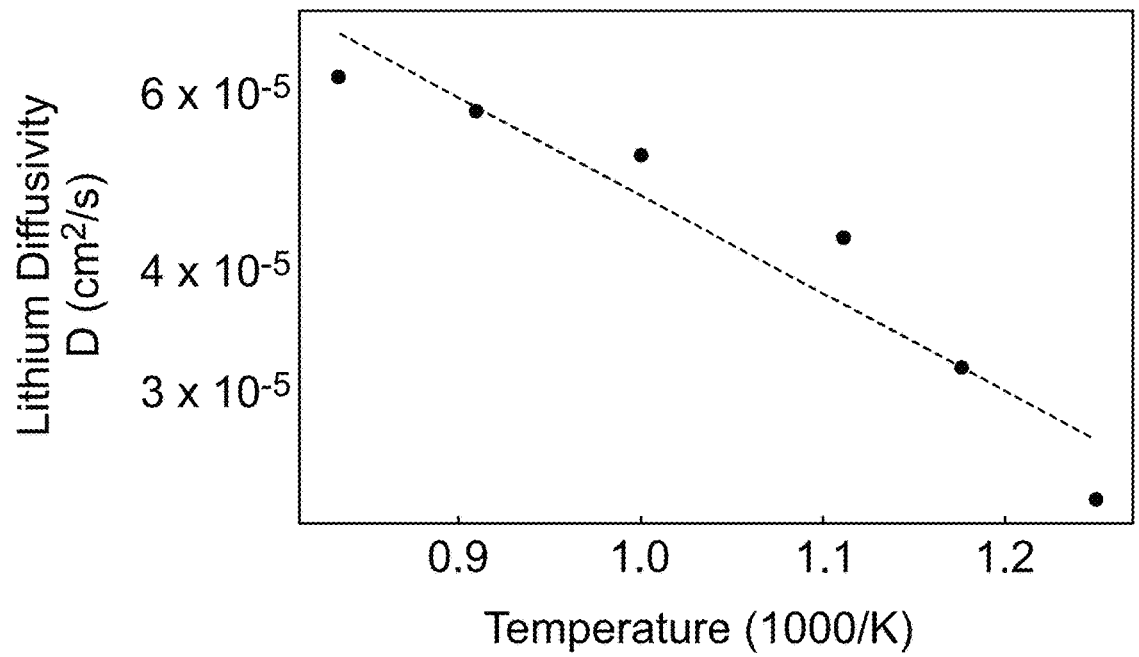
FIG. 20 is a graph of the lithium diffusivity (cm$^2$/s) versus temperature (K$^{-1}$) showing the results of Arrhenius analysis of the Li$_{2.25}$Mg$_2$(S$_{0.917}$P$_{0.083}$O$_4$)$_3$ of Prophetic Example 5.

The lithium conductivity of $Li_{1.375}Sc_{0.675}Mg_{0.375}As_2O_7$ will be determined in a blocking electrode cell by complex impedance, using the same method as in Prophetic Example 1. Shown in FIG. 20 is an Arrhenius plot of the results determined by AIMD, indicating an activation energy of 0.19 eV and a conductivity of 15 millisiemens per centimeter (mS/cm) at 27° C.

Prophetic Example 6

$Li_{1.25}Zn_{0.875}BO_3$

Figure 21:
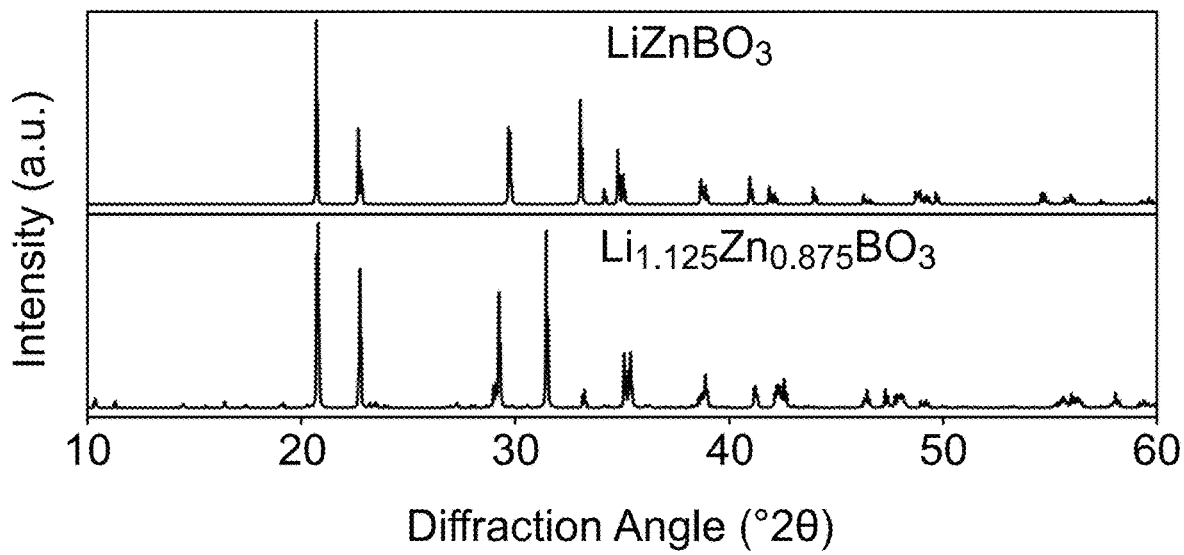
FIG. 21 is a graph of intensity (arbitrary units, a.u.) versus diffraction angle (degrees 2θ) showing a calculated XRD pattern for Li$_{1.125}$Zn$_{0.875}$BO$_3$ of Prophetic Example 6 and a calculated XRD pattern for LiZnBO$_3$.

Stoichiometric amounts of lithium borate and zinc oxide will be combined to provide a mixture. The mixture will be ball-milled in a stainless steel container using zirconia balls in air at 400 RPM for 100 hours to provide $Li_{1.25}Zn_{0.875}BO_3$. The product will be analyzed by X-ray powder diffraction using CuKα radiation, the results of which are shown in FIG. 21. Also shown in FIG. 21 for reference is a calculated XRD spectrum for $LiZnBO_3$. The XRD results shown in FIG. 21 are consistent with $Li_{1.25}Zn_{0.875}BO_3$.

Figure 22:
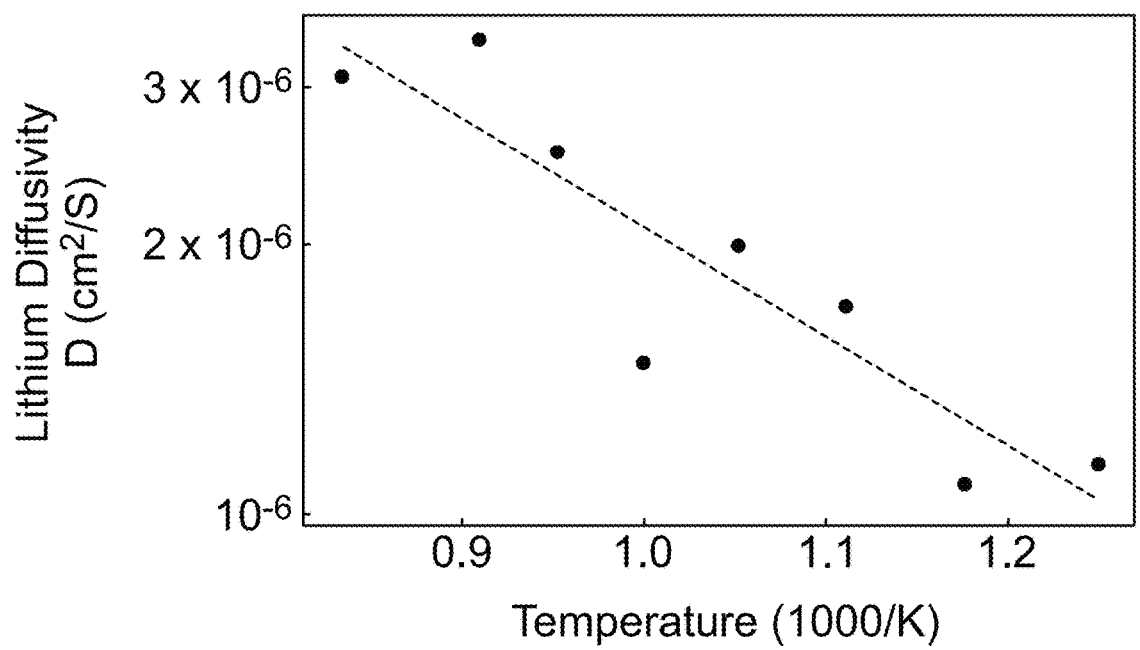
FIG. 22 is a graph of the lithium diffusivity (cm$^2$/s) versus temperature (K$^{-1}$) showing the results of Arrhenius analysis of the Li$_{1.125}$Zn$_{0.875}$BO$_3$ of Prophetic Example 6.

The lithium conductivity of $Li_{1.25}Zn_{0.875}BO_3$ will be determined in a blocking electrode cell by complex impedance, using the same method as in Prophetic Example 1. Shown in FIG. 22 is an Arrhenius plot of the results determined by AIMD, indicating an activation energy of 0.24 eV and a conductivity of 0.34 millisiemens per centimeter (mS/cm) at 27° C.

Prophetic Example 7

$Li_{3.125}In_{0.875}Zn_{0.125}(BO_3)_2$

Figure 23:
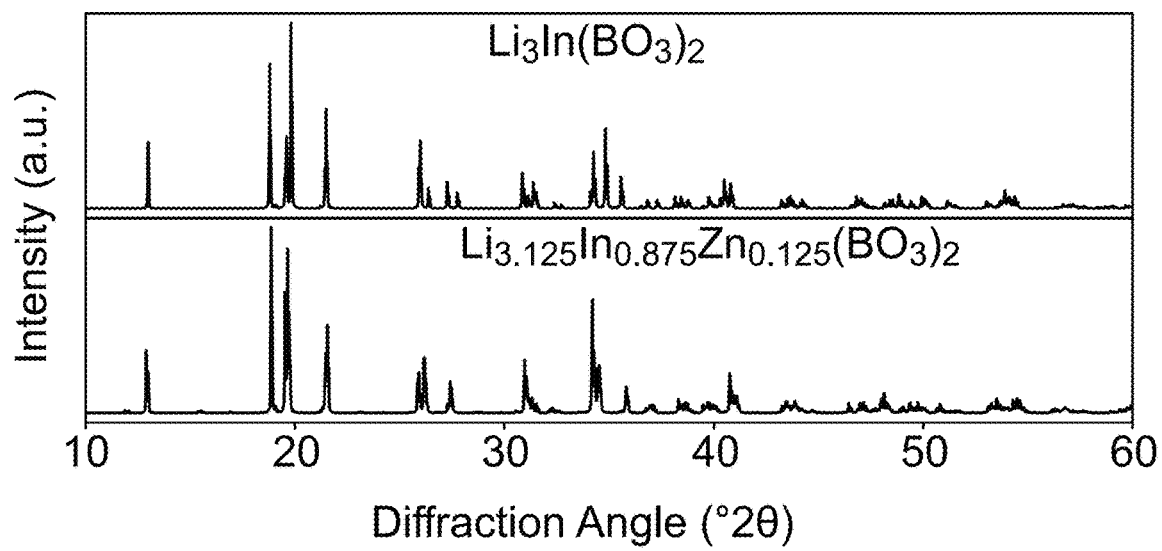
FIG. 23 is a graph of intensity (arbitrary units, a.u.) versus diffraction angle (degrees 2θ) showing a calculated XRD pattern for Li$_{3.125}$In$_{0.875}$Zn$_{0.125}$(BO$_3$)$_2$ of Prophetic Example 7 and a calculated XRD pattern for Li$_3$In(BO$_3$)$_2$.

Stoichiometric amounts of lithium oxide, indium oxide, zinc oxide, and lithium borate will be combined to provide a mixture. The mixture will be ball-milled in a stainless steel container using zirconia balls in air at 400 RPM for 100 hours to provide $Li_{3.125}In_{0.875}Zn_{0.125}(BO_3)_2$. The product will be analyzed by X-ray powder diffraction using CuKα radiation, the results of which are shown in FIG. 23. Also shown in FIG. 23 for reference is a calculated XRD spectrum for $Li_3InB(O_3)_3$. The XRD results shown in FIG. 23 are consistent with $Li_{3.125}In_{0.875}Zn_{0.125}(BO_3)_2$.

Figure 24:
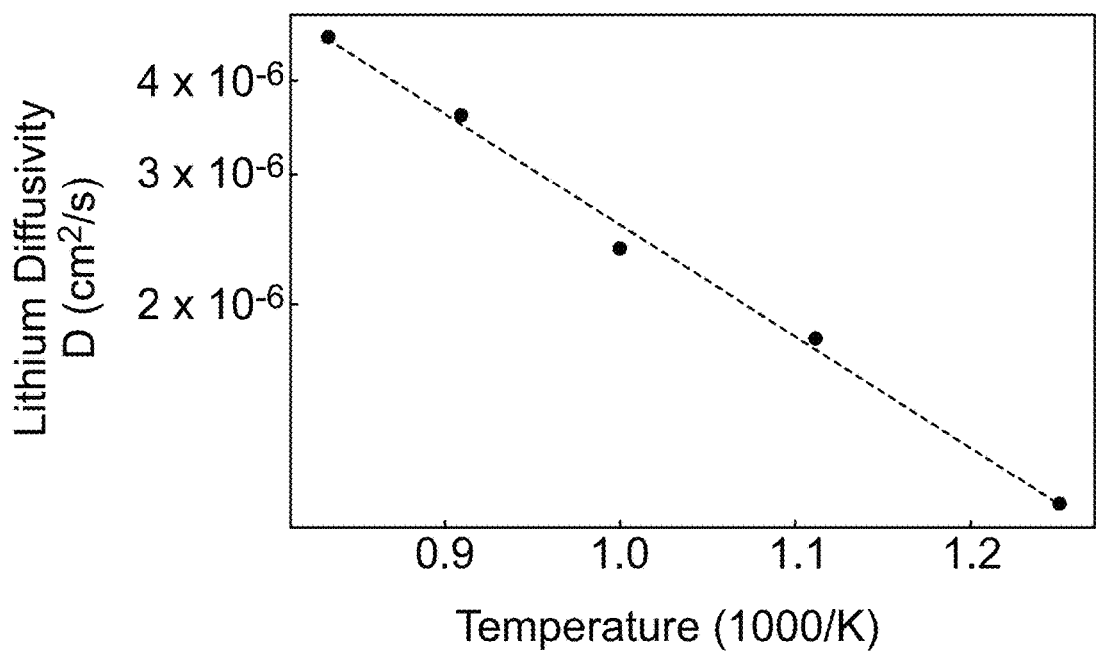
FIG. 24 is a graph of the lithium diffusivity (cm$^2$/s) versus temperature (K$^{-1}$) showing the results of Arrhenius analysis of the Li$_{3.125}$In$_{0.875}$Zn$_{0.125}$(BO$_3$)$_2$ of Prophetic Example 7.

The lithium conductivity of $Li_{3.125}In_{0.875}Zn_{0.125}(BO_3)_2$ will be determined in a blocking electrode cell by complex impedance, using the same method as in Prophetic Example 1. Shown in FIG. 24 is an Arrhenius plot of the results determined by AIMD, indicating an activation energy of 0.30 eV and a conductivity of 0.13 millisiemens per centimeter (mS/cm) at 27° C.

Prophetic Example 8

$Li_{2.125}B_3P_{0.875}Si_{0.125}O_8$

Figure 25:
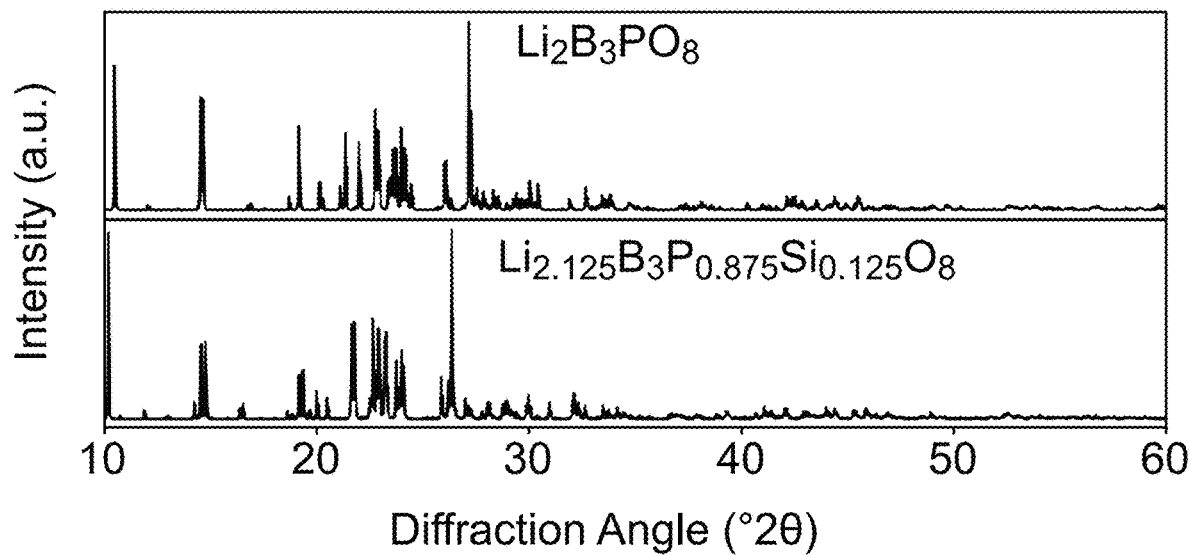
FIG. 25 is a graph of intensity (arbitrary units, a.u.) versus diffraction angle (degrees 2θ) showing a calculated XRD pattern for Li$_{2.125}$B$_3$P$_{0.875}$Si$_{0.125}$O$_8$ of Example 1 and for reference and a calculated XRD pattern for pattern for Li$_3$BP$_2$O$_8$.

Stoichiometric amounts of lithium borate, lithium phosphate, and silicon dioxide will be combined to provide a mixture. The mixture will be ball-milled in a stainless steel container using zirconia balls in air at 400 RPM for 100 hours to provide $Li_{2.125}B_3P_{0.875}Si_{0.125}O_8$. The product will be analyzed by X-ray powder diffraction using CuKα radiation, the results of which are shown in FIG. 25. Also shown in FIG. 25 for reference is a calculated XRD spectrum for $Li_2B_3PO_8$. The XRD results shown in FIG. 25 are consistent with $Li_{2.125}B_3P_{0.875}Si_{0.125}O_8$.

Figure 26:
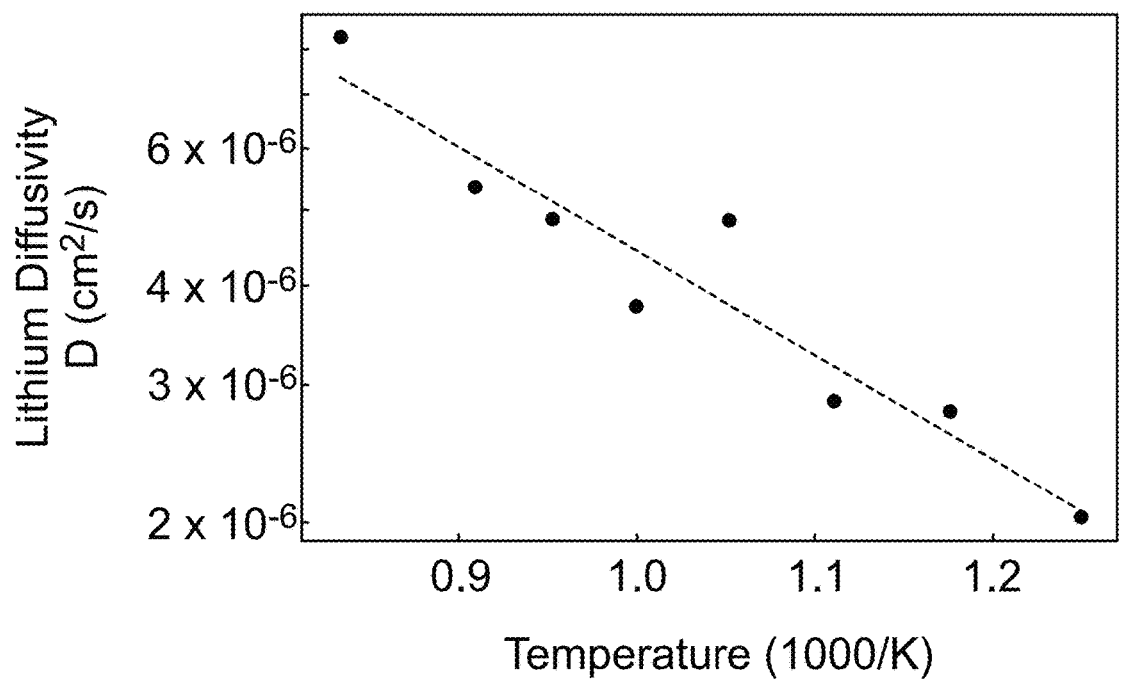
FIG. 26 is a graph of the lithium diffusivity (cm$^2$/s) versus temperature (K$^{-1}$) showing the results of Arrhenius analysis of the Li$_{2.125}$B$_3$P$_{0.875}$Si$_{0.125}$O$_8$ of Prophetic Example 8.

The lithium conductivity of $Li_{2.125}B_3P_{0.875}Si_{0.125}O_8$ will be determined in a blocking electrode cell by complex impedance, using the same method as in Prophetic Example 1. Shown in FIG. 26 is an Arrhenius plot of the results determined by AIMD, indicating an activation energy of 0.26 eV and a conductivity of 0.30 millisiemens per centimeter (mS/cm) at 27° C.

Example 1

$Li_{3.125}B(P_{0.94}Si_{0.06}O_4)_2$

The starting materials and amounts used to prepare $Li_{3.125}B(P_{0.94}Si_{0.06}O_4)_2$ are shown in Table 1.

TABLE 1

| Material | Amount (moles) | Amount (grams) |
|---|---|---|
| $Li_2CO_3$ | 1.5625 | 1.1547 |
| $H_3BO_3$ | 1 | 0.6183 |
| $NH_4H_2PO_4$ | 1.8750 | 2.1568 |
| $SiO_2$ | 0.1250 | 0.0751 |

Figure 27:
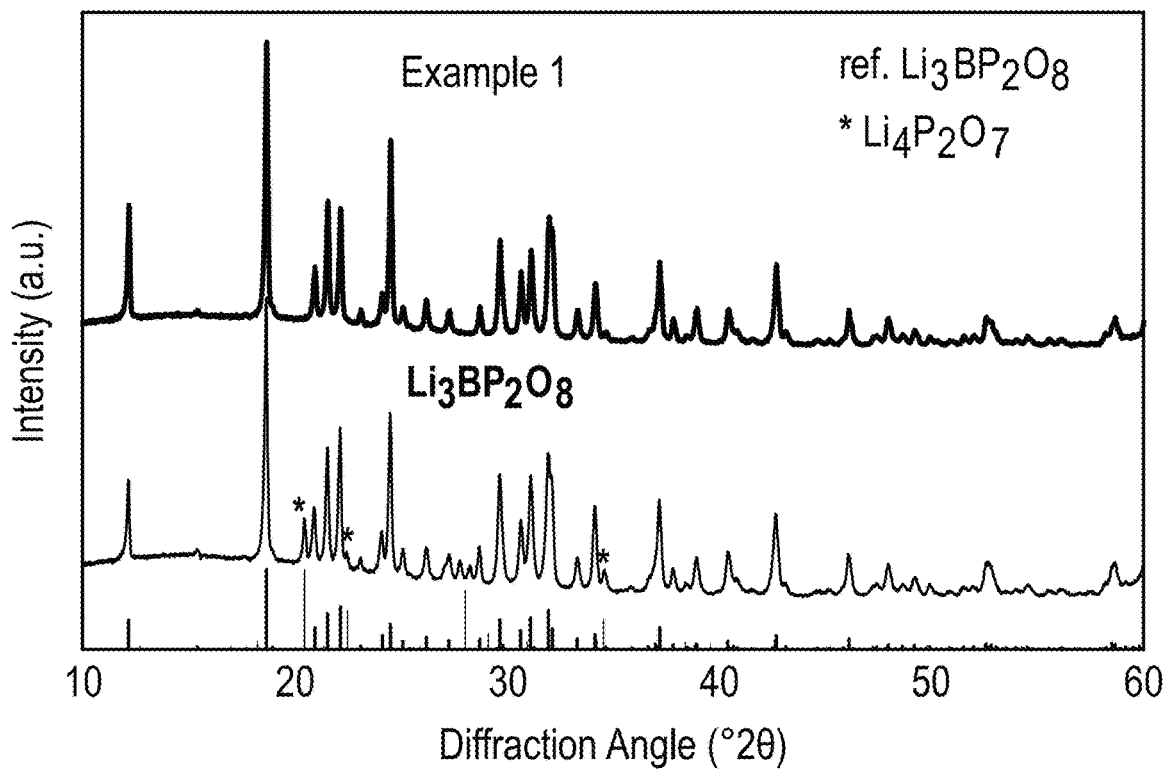
FIG. 27 is a graph of intensity (arbitrary units, a.u.) versus diffraction angle (degrees 2θ) showing the results of XRD analysis of Li$_{3.125}$B(P$_{0.94}$Si$_{0.06}$O$_4$)2 of Example 1, Li$_3$BP$_2$O$_8$, and calculated peak positions for Li$_3$BP$_2$O$_8$ and Li$_4$P$_2$O$_7$.

The starting materials were combined to provide a mixture, and then heat-treated in air at 200° C. for 9 hours, then 550° C. for 12 hours, then 600° C. for 12 hours, and then at 650° C. for 12 hours, with mobilization and pelletizing in air between each heat-treatment. The product was analyzed by X-ray powder diffraction, the results of which are shown in FIG. 27. Also shown in FIG. 27 for reference are peak positions for $Li_3BP_2O_8$ and $Li_4P_2O_7$, and the XRD pattern for $Li_3BP_2O_8$ prepared using the same method but omitting the $SiO_2$.

Figure 28:
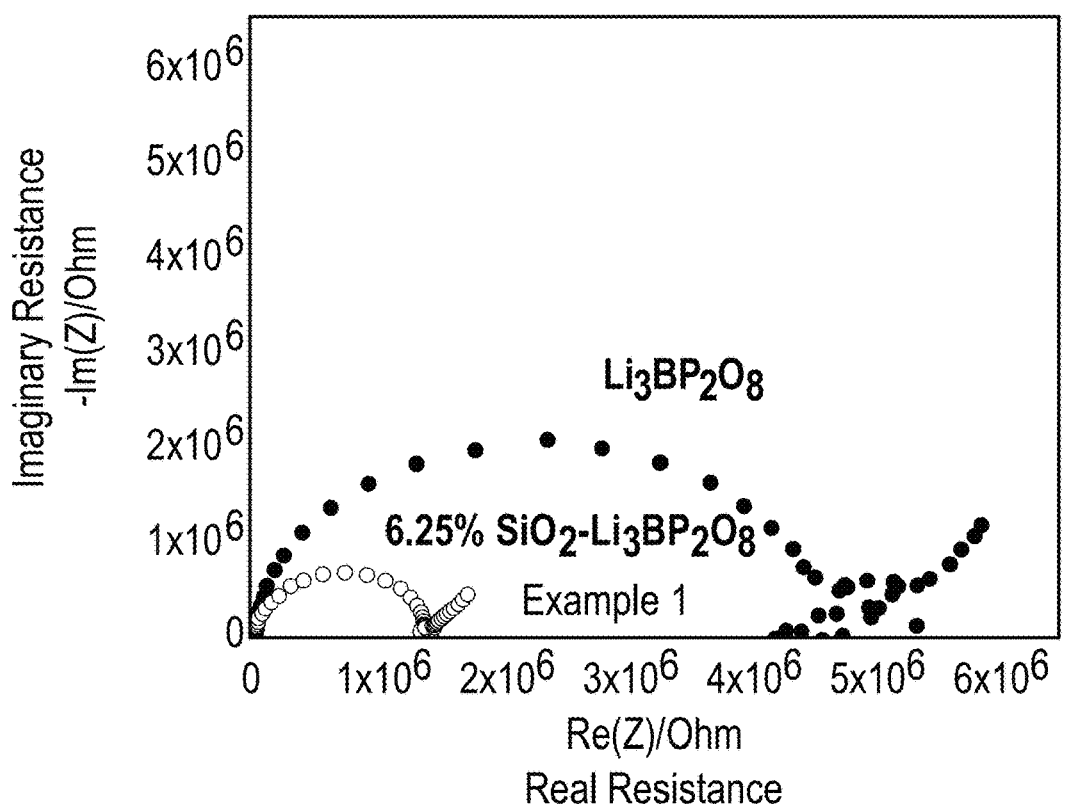
FIG. 28 is a graph of imaginary resistance (Z, ohms) versus real resistance (Z, ohms) showing the results of lithium ion conductivity analysis of the Li$_{3.125}$B(P$_{0.94}$Si$_{0.06}$O$_4$)$_2$ product of Example 1 and Li$_3$BP$_2$O$_8$.

The room temperature conductivity of $Li_{3.125}B(P_{0.94}Si_{0.06}O_4)_2$ and $Li_3BP_2O_8$ were determined using the method of Prophetic Example 1. For the conductivity measurements, the $Li_{3.125}B(P_{0.94}Si_{0.06}O_4)_2$ and $Li_3BP_2O_8$ were pressed to provide pellets having a porosity of 14% and 17%, respectively. A Nyquist plot showing results of the conductivity analysis is shown in FIG. 28. The results in FIG. 28 indicate that the $Li_{3.125}B(P_{0.94}Si_{0.06}O_4)_2$ has a lithium conductivity of $2.5 \times 10^{-4}$ mS/cm. For comparison, the $Li_3BP_2O_8$ had a lithium conductivity of $7 \times 10^{-5}$ mS/cm.

Various embodiments are shown in the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, or sections, these elements, components, regions, layers, or sections should not be limited by these terms. These terms are only used to distinguish one element, component, region, layer, or section from another element, component, region, layer or section. Thus, "a first element," "component," "region," "layer," or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." It will be further understood that the terms "comprises" and/or "comprising," or "includes" or "including" when used in this specification, specify the presence of stated features, regions, integers, steps, operations, elements, or components, but do not preclude the presence or addition of one or more other features, regions, integers, steps, operations, elements, components, or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Oxidation state" as used herein is a formalism used to describe a hypothetical charge that an atom would have if all bonds to atoms of different elements were 100% ionic, with no covalent component.

"Group" means a group of the Periodic Table of the Elements according to the International Union of Pure and Applied Chemistry ("IUPAC") Group 1-18 group classification system.

While a particular embodiment has been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A solid-state ion conductor comprising a compound of Formula 2:

$$Li_{5+4(6-a2)y2}B(S_{1-y2}A2_{y2}^{a2}O_4)_4 \quad \text{Formula 2}$$ 

wherein, in Formula 2,
  A2 is an element of Groups 4, 5, 14, 15, 17, or a combination thereof, wherein an oxidation state of A2 is $4 \leq a2 \leq 5$, and $0 < y2 < 1$.

2. The solid-state ion conductor of claim 1, wherein A2 is Ti, Zr, Hf, V, Nb, Ta, Si, Ge, Sn, P, As, Sb, Bi, Cl, Br, I, or a combination thereof.

3. The solid-state ion conductor of claim 2, wherein A2 is P, a2 is 5, and $0.03 < y2 < 0.1$.

4. The solid-state ion conductor of claim 3, wherein a structure of the solid-state ion conductor comprises corner-sharing $BO_4$ tetrahedra and $SO_4$ tetrahedra.

5. The solid-state ion conductor of claim 4, wherein in the structure of the solid-state ion conductor A2 resides on a S site and a lithium coordination environment is non-symmetric.

6. A solid-state ion conductor comprising a compound of Formula 3:

$$Li_{(2+m3+3y3(6-b))}M3_{m3}A3_{(2-m3)}(S_{(1-y3)}X^b_{y3}O_4)_3 \quad \text{Formula 3}$$ 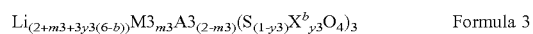

wherein, in Formula 3,
  M3 is an element of Groups 1, 11, or a combination thereof,
  A3 is an element of Groups 2, 12, or a combination thereof, X is an element of Groups 4, 5, 14, 15, 17, or a combination thereof, wherein an oxidation state of X is b, and $0 \leq m3 < 1$, $0 \leq y3 < 1$, and $4 \leq b \leq 5$, wherein at least one of m3 and y3 is not 0.

7. The solid-state ion conductor of claim 6, wherein M3 is Li, Na, K, Cs, Cu, Ag, or a combination thereof.

8. The solid-state ion conductor of claim 6, wherein A3 is Mg, Ca, Sr, Zn, or a combination thereof.

9. The solid-state ion conductor of claim 6, wherein X is Ti, Zr, Hf, V, Nb, Ta, Si, Ge, Sn, P, As, Sb, Bi, Cl, Br, I, or a combination thereof.

10. The solid-state ion conductor of claim 9, wherein A3 is Mg and X is P.

11. The solid state ion conductor of claim 10, wherein m3 is 0, $0.03 \leq y3 \leq 0.1$, and b is 5.

12. The solid-state ion conductor of claim 11, wherein a structure of the solid-state ion conductor comprises corner-sharing $MgO_6$ octahedra and $SO_4$ tetrahedra.

13. A positive electrode comprising:
a positive active material layer comprising a lithium transition metal oxide, a lithium transition metal phosphate, or a combination thereof; and
the solid-state ion conductor of claim 1 on the positive active material layer.

14. A positive electrode comprising:
a positive active material layer comprising a lithium transition metal oxide, a lithium transition metal phosphate, or a combination thereof; and
the solid-state ion conductor of claim 6 on the positive active material layer.

15. An electrochemical cell comprising:
a positive electrode;
a negative electrode; and
an electrolyte layer between the positive electrode and the negative electrode,
wherein at least one of the positive electrode, the negative electrode, or the electrolyte layer comprises the solid-state ion conductor of claim 1.

16. An electrochemical cell comprising:
a positive electrode;
a negative electrode; and
an electrolyte layer between the positive electrode and the negative electrode,
wherein at least one of the positive electrode, the negative electrode, or the electrolyte layer comprises the solid-state ion conductor of claim 6.

* * * * *